US010063386B2

(12) United States Patent
Kunitake et al.

(10) Patent No.: US 10,063,386 B2
(45) Date of Patent: Aug. 28, 2018

(54) CONTROL METHOD, CONTROLLER, AND RECORDING MEDIUM

(71) Applicant: Panasonic Intellectual Property Corporation of America, Torrance, CA (US)

(72) Inventors: Yuji Kunitake, Kyoto (JP); Tomonori Nakamura, Osaka (JP); Ryota Miyazaki, Osaka (JP); Kohei Tahara, Osaka (JP)

(73) Assignee: PANASONIC INTELLECTUAL PROPERTY CORPORATION OF AMERICA, Torrace, CA (US)

( * ) Notice: Subject to any disclaimer, the term of this patent is extended or adjusted under 35 U.S.C. 154(b) by 311 days.

(21) Appl. No.: 15/156,337

(22) Filed: May 17, 2016

(65) Prior Publication Data

US 2016/0344568 A1 Nov. 24, 2016

(30) Foreign Application Priority Data

May 22, 2015 (JP) .................................. 2015-104636
Feb. 2, 2016 (JP) .................................. 2016-017793

(51) Int. Cl.
*H04L 12/28* (2006.01)
*H04W 68/00* (2009.01)
(Continued)

(52) U.S. Cl.
CPC ........ *H04L 12/2803* (2013.01); *G05B 19/042* (2013.01); *H04L 12/2821* (2013.01);
(Continued)

(58) Field of Classification Search
CPC .......... G05B 19/042; G05B 2219/2642; H04L 12/2803; H04L 12/2821; H04L 12/2827;
(Continued)

(56) References Cited

U.S. PATENT DOCUMENTS

2003/0130984 A1* 7/2003 Quinlan .................... G06F 9/52
2006/0140205 A1   6/2006 Baik et al.
(Continued)

FOREIGN PATENT DOCUMENTS

EP    2804282       11/2014
JP    2004-248043   9/2004

OTHER PUBLICATIONS

Communication pursuant to Article 94(3) EPC dated Jun. 20, 2017 for the related European Patent Application No. 16169193.6.
(Continued)

*Primary Examiner* — Christopher E Everett
*Assistant Examiner* — Michael J. Huntley
(74) *Attorney, Agent, or Firm* — Greenblum & Bernstein, P.L.C.

(57) ABSTRACT

A control method includes executing a first application for operating a first appliance in order to provide a first service to a user. As a result, a first command is transmitted to the appliance corresponding to the first application. A second application is then executed for operating the first equipment in order to provide a second service to the user. As a result, a second command is transmitted to the appliance corresponding to the second application. Execution of at least the first application is terminated when the first application and the second application are alternately executed on the first appliance at least a predetermined number of times to stop the transmission of the first command to the first appliance.

13 Claims, 13 Drawing Sheets

(51) Int. Cl.
*G05B 19/042* (2006.01)
*H04L 29/08* (2006.01)

(52) U.S. Cl.
CPC ...... *H04L 12/2827* (2013.01); *H04L 12/2829* (2013.01); *H04L 67/12* (2013.01); *H04W 68/005* (2013.01); *G05B 2219/2642* (2013.01)

(58) Field of Classification Search
CPC ... H04L 12/2829; H04L 67/12; H04W 68/005
See application file for complete search history.

(56) References Cited

U.S. PATENT DOCUMENTS

| | | | |
|---|---|---|---|
| 2013/0041852 A1* | 2/2013 | Ellis | G06Q 50/06 705/412 |
| 2013/0090773 A1* | 4/2013 | Park | H04L 12/12 700/286 |
| 2013/0110569 A1* | 5/2013 | Meyerhofer | G06Q 10/10 705/7.16 |
| 2013/0184874 A1* | 7/2013 | Frader-Thompson | F24F 11/0001 700/276 |
| 2013/0249441 A1* | 9/2013 | Roosli | H05B 37/0245 315/312 |
| 2013/0268129 A1* | 10/2013 | Fadell | G06Q 10/20 700/278 |
| 2014/0277769 A1* | 9/2014 | Matsuoka | F24F 11/30 700/278 |
| 2014/0343698 A1* | 11/2014 | Kakuta | H02J 3/14 700/90 |
| 2014/0371922 A1* | 12/2014 | Weaver | H02J 3/14 700/276 |

OTHER PUBLICATIONS

Carreira Paulo et al: "Towards automatic conflict detection in home and building automation systems", Pervasive and Mobile Computing, vol. 12, Jun. 17, 2013 (Jun. 17, 2013), pp. 37-57, XP029028436.

The Extended European Search Report dated Jul. 7, 2016 for the related European Patent Application No. 16169193.6.

* cited by examiner

| STATE MONITOR TABLE | | 300 |
|---|---|---|
| EQUIPMENT ID | SERVICE ID | |
| aircon_0a12ab4cb611 | A, B | |
| light_0b2c998a5c7a | C, B | |

| SERVICE ID | EQUIPMENT ID | COMMAND | REPETITION COUNT |
|---|---|---|---|
| | | LOOP CANDIDATE TABLE | |
| A | aircon_0a12ab4cb611 | HEATING TO 25°C | 5 |
| B | aircon_0a12ab4cb611 | OFF | 4 |
| C | light_0b2c998a5c7a | ON | 1 |

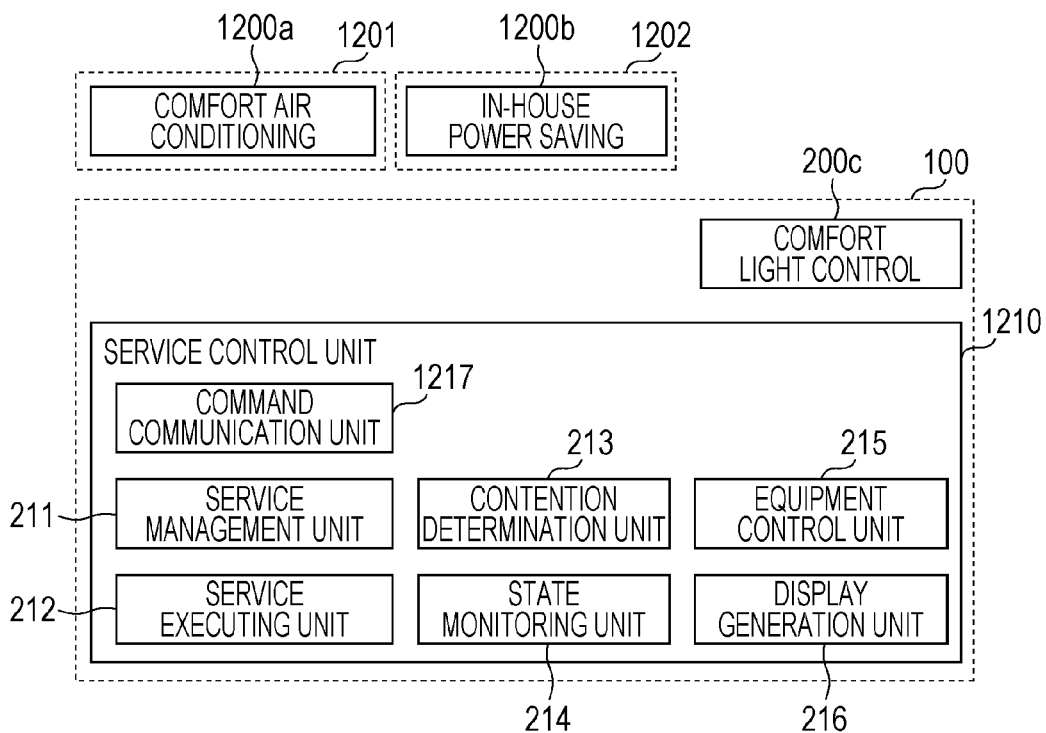

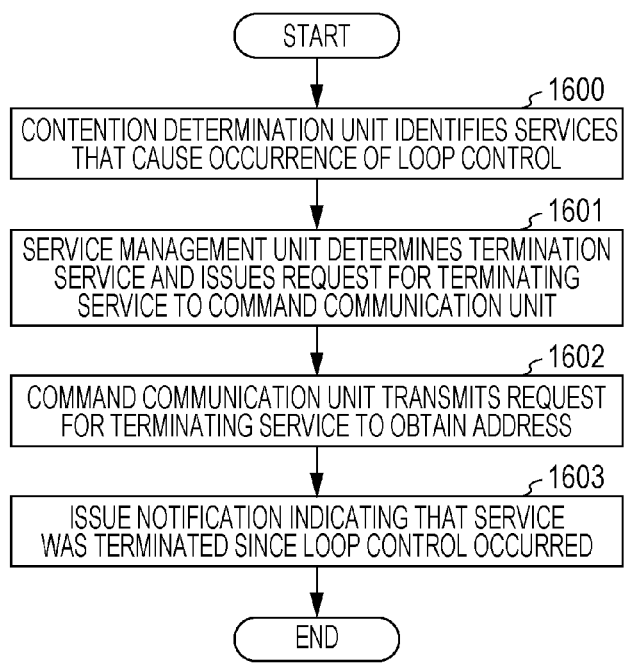

CONTROL METHOD, CONTROLLER, AND RECORDING MEDIUM

BACKGROUND

1. Technical Field

The present disclosure relates to a control method and a controller for controlling execution of services for controlling equipment connected to a home network and also to a recording medium.

2. Description of the Related Art

Heretofore, a home controller has been known that can execute a plurality of services for remotely controlling equipment connected to a home network. The known home controller, however, has a problem in that the services for controlling the equipment connected to the home network simultaneously perform contradictory control on the same equipment (e.g., turning on and off the power supply of the same equipment).

In order to overcome the problem, one known technology is to detect a service that can perform contradictory control on the same equipment, by analyzing, during installation of a new service, control conditions for equipment which are set for an installed service and control conditions for equipment which are set for the new service to be installed and detecting a contradictory control condition (see, for example, Japanese Unexamined Patent Application Publication No. 2004-248043 (hereinafter referred to as "Patent Document 1")).

However, a further improvement is required to detect that a plurality of services is performing contradictory control on the same equipment.

SUMMARY

In one general aspect, the techniques disclosed here feature a control method for a controller configured to control a first appliance connected to a network. The control method includes: executing a first application for operating the first appliance in order to provide a first service; transmitting a first command corresponding to the first application to the first appliance; executing a second application for operating the first appliance in order to provide a second service; transmitting a second command corresponding to the second application to the first appliance; storing an execution log each time the first application and the second application are executed, wherein the execution log includes a first log corresponding to execution of the first application and a second log corresponding to execution of the second application, the first log including an identifier of the first service, an identifier of the first appliance, and a first operation that the first command causes the first appliance to execute, and the second log including an identifier of the second service, the identifier of the first appliance, and a second operation that the second command causes the first appliance to execute; detecting that the first application and the second application are alternately executed with respect to the first appliance at least a predetermined number of times, based on the execution log; terminating the execution of at least the first application when the first application and the second application are alternately executed the at least the predetermined number of times; and stopping the transmission of the first command to the first appliance.

According to the present disclosure, it is possible to realize a further improvement.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 17 is a diagram illustrating the functional configuration of a home network system including a home controller in the second embodiment;

FIG. 18 illustrates one example of a service management table;

FIG. 20 is a flowchart illustrating one example of a processing flow of disabling loop control in the second embodiment; and FIG. 21 illustrates another example of the service management table.

DETAILED DESCRIPTION (Knowledge Underlying Present Disclosure)

Figure 1:
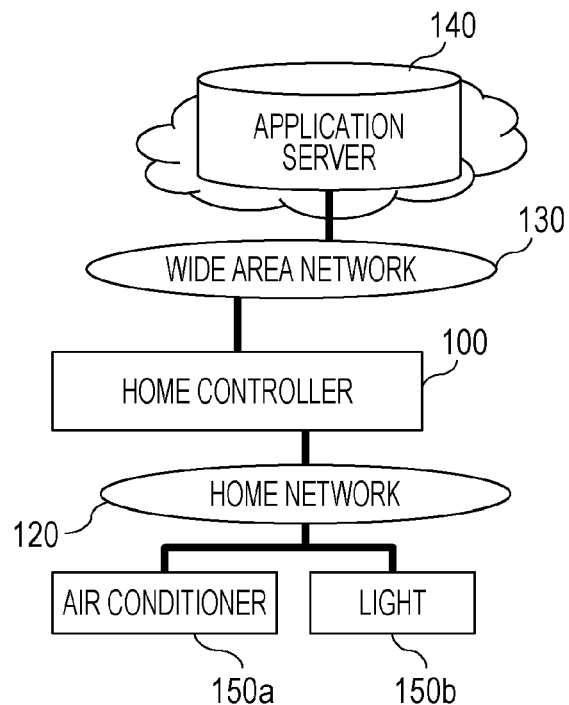
FIG. 1 is a diagram illustrating an overview of a home network system in a first embodiment.

A technique has been studied that controls equipment connected to a home network by using various services including services provided by third parties. While there are users who wish to use various services according to their preferences, there is a problem in that settings of equipment to be controlled by the services can be changed by other means, such as operations using genuine remote controls for the main units of the equipment and control performed by other services. In order to address this problem, each service takes measures including monitoring the state of equipment to be controlled, terminating the service or re-setting of the equipment when an unintended state change occurs, and so on.

The equipment state monitoring can be realized by the equipment notifying each service about a state change. The state change notification is like the so-called event notification and is realized using, for example, a callback function or the like. When a plurality of services is to control the same equipment, each service individually performs operation upon receiving a notification indicating a state change in the equipment. At this point, if each service performs re-setting on the equipment, there is a possibility that the so-called loop control (or, repetitive control) in which the plurality of services repeats the re-setting of the equipment occurs.

For example, it is assumed that, when service A sets the operation of an air conditioner to an operation for heating to 25° C., service B receives a notification indicating that the state of the air conditioner has changed to a state for performing the operation for heating to 25° C. and then performs re-setting for turning off the power supply of the air conditioner. In this case, upon receiving a notification indicating that the state of the air conditioner has changed to the state in which the power supply is turned off, service A re-sets the air conditioner to the operation for heating to 25° C. Thus, loop control occurs in which the control for setting the operation of the air conditioner to the operation for heating to 25° C., the control being performed by the service A, and the control for turning off the power supply of the air conditioner, the control being performed by the service B, are repeated.

In order to address such a problem, Patent Document 1 discloses a technique in which equipment control conditions set for individual control programs are checked during initial setup of the control programs to determine whether or not a contradictory operation occurs. In Patent Document 1, when it is determined that a contradictory operation occurs, a user is made to set priorities of the control programs, and each control program to be executed is selected based on the set priorities, to thereby prevent the contradictory operation from occurring. Patent Document 1 discloses a technique in which a control operation (an operation of the equipment) is directly monitored, and only when a contradictory operation occurs, control may be performed so as to clear the contradiction, but does not disclose a specific implementation method.

That is, in the related technique, no consideration has been given to detecting and disabling contradictory control on the same equipment on the basis of details of actual equipment control performed by a plurality of services.

One non-limiting and exemplary embodiment provides a technique that makes it possible to detect and disable repetitive control, which is one mode of contradictory control on the same equipment, on the basis of details of actual equipment control performed by a plurality of services.

(1) A control method according to a first aspect of the present disclosure is directed to a control method for a controller configured to control a first appliance connected to a network, the control method including: executing a first application for operating the first appliance in order to provide a first service; transmitting a first command corresponding to the first application to the first appliance; executing a second application for operating the first appliance in order to provide a second service; transmitting a second command corresponding to the second application to the first appliance; storing an execution log each time the first application and the second application are executed, wherein the execution log includes a first log corresponding to execution of the first application and a second log corresponding to execution of the second application, the first log including an identifier of the first service, an identifier of the first appliance, and a first operation that the first command causes the first appliance to execute, and the second log including an identifier of the second service, the identifier of the first appliance, and a second operation that the second command causes the first appliance to execute; detecting that the first application and the second application are alternately executed with respect to the first appliance at least a predetermined number of times, based on the execution log; terminating the execution of at least the first application when the first application and the second application are alternately executed the at least the predetermined number of times; and stopping the transmission of the first command to the first appliance.

According to this configuration, the occurrence of loop control, which is one mode of contradictory control on the same equipment, caused by the execution of the first service and the second service can be detected based on details of equipment control actually performed by the execution of the services.

When the occurrence of the repetitive control is detected, a termination request for terminating at least one of the first service and the second service is issued to thereby terminate the at least one of the services. This makes it possible to disable the control simultaneously performed on the same equipment by two services. As a result, it is possible to disable the repetitive control.

(2) In the above-described aspect, the execution of the first application may be started prior to the execution of the second application.

After the first service is started, when the user starts the second service as a service he or she wishes to use more than the first service, there is a case in which loop control on the same equipment occurs owing to control executed by the first service and the second service. In such a case, according to this configuration, it is possible to disable the repetitive control by terminating the first service that was started earlier, without terminating the second service that was most recently started and that the user possibly wishes to use.

(3) In the above-described aspect, the execution of the first application may be started after the execution of the second application.

When the second service is started after the first service is started, and the user wishes to continuously use the first service, there is a case in which loop control on the same equipment occurs owing to control executed by the first service and the second service. In such a case, according to this configuration, it is possible to disable the repetitive control by terminating the second service that was started later, without terminating the first service that the user wishes to continuously use.

Thus, while continuously using the first service, as desired, the user can take measures for preventing the occurrence of loop control, for example, by rechecking details of the equipment control performed by the second service that was started later or by rechecking a service that is to be started.

(4) In the above-described aspect, the first service may be a service that is not a preset service.

According to this configuration, when it is desired not to terminate the first (second) service, it is possible to preset the first (second) service as the above-mentioned preset service. This makes it possible to prevent the issuance of the termination request for the first (second) service that the user does not want to terminate, even when loop control on the same equipment occurs owing to control executed by the first service and the second service.

(5) In the above-described aspect, the control method may further include transmitting to a user notification information indicating that the transmission of the first command has been stopped.

According to this configuration, the user can easily check that the service was terminated since loop control on the same equipment occurred owing to control executed by the first service and the second service.

(6) In the above-described aspect, the control method may further include: storing first information indicating a correspondence between the first service, and the ID of the first service and a correspondence between the second service and the ID of the second service; and identifying the first service, based on the first information. The notification information may indicate the first service.

According to the configuration, the user can easily check the service that has caused the occurrence of the repetitive control on the same equipment.

(7) In the above-described aspect, the control method may further include: storing second information indicating a correspondence between the first appliance and the identifier of the first appliance, and a correspondence between the second appliance and the identifier of the second appliance; and identifying the first appliance and the first operation, based on the execution log and the second information. The notification information may further indicate the first appliance and the first operation.

In addition, according to this configuration, it is possible to notify the user about the equipment on which the repetitive control was performed and details of the control. Thus, the user can easily recheck the details of the equipment control performed by the service that caused the occurrence of the repetitive control.

(8) In the above-described aspect, the user may include a first user; the control method may further include storing, based on the execution log, third information indicating a correspondence of the ID of the first service provided to the first user upon executing the first application, an ID of the first user, and an ID of a first terminal, the ID of the first terminal being associated with the first user; and the notification information may be transmitted to the first terminal, based on the third information.

According to this configuration, the user who had started the service for which the termination request was issued is notified that the termination request was issued, since loop control on the same equipment occurred owing to control executed by the first service and the second service. Thus, the user who had started the service for which the termination request was issued can recheck details of the equipment control performed by the service for which the termination request was issued, without affect services used by other users.

(9) In the above-described aspect, the control method may further include storing fourth information and fifth information, based on the execution log. The fourth information indicates a correspondence of the ID of the first service provided to the user upon executing the first application, the ID of the first appliance, the first operation, and the number of times the first command was transmitted to the first appliance, and the fifth information indicates a correspondence of the ID of the second service provided to the user upon executing the second application, the ID of the first appliance, the second operation, and the number of times the second command was transmitted to the first appliance. The control method further includes deleting the fourth information at every predetermined time interval, when the ID of the first service indicates a predetermined service, and deleting the fifth information at every predetermined time interval, when the ID of the second service indicates the predetermined service.

According to this configuration, it is possible to prevent control information corresponding to the predetermined service from being managed for a predetermined amount of time or more as state information. As a result, it is possible to reduce cases in which the occurrence of loop control due to control executed by the predetermined service is detected based on the state information.

(10) A control method according to a second aspect of the present disclosure is directed to a control method for a controller for controlling an appliance connected to a network, the controller being connected to a server, the control method including: transmitting a first command corresponding to a first application executed by the server to the appliance, the first application being an application for operating the appliance in order to provide the first service; transmitting a second command corresponding to a second application executed by the server to the appliance, the second application being an application for operating the appliance in order to provide a second service; storing an execution log each time the first application and the second application are executed, wherein the execution log includes a first log corresponding to execution of the first application and a second log corresponding to execution of the second application, the first log including an identifier of the first service, an identifier of the appliance, and a first operation that the first command causes the appliance to execute, and the second log including an identifier of the second service, the identifier of the appliance, and a second operation that the second command causes the appliance to execute; detecting that the first application and the second application are alternately executed on the appliance a predetermined number of times or more, based on the execution log; transmitting, to the server, a termination request for causing the server to terminate the execution of at least the first application, when the first application and the second application are alternately executed a predetermined number of times or more; and stopping the transmission of the first command to the appliance.

According to this configuration, based on details of equipment control actually performed by execution of services (hereinafter referred to as "network services") provided from a service providing apparatus over a network, it is possible to detect the occurrence of loop control, which is one mode of contradictory control on the same equipment, caused by the execution of a first network service and a second network service.

According to this configuration, when the occurrence of the repetitive control is detected, a request for controlling the equipment, the request being transmitted from at least one of the first network service and the second network service, is rejected instead of issuing the termination request for terminating the at least one of the first network service and the second network service.

Thus, even when an authority to terminate the at least one network service provided from the service providing apparatus is not given, it is possible to prevent the two network services from simultaneously performing control on the same equipment. As a result, it is possible to disable the repetitive control.

(11) A control method according to a third aspect of the present disclosure is directed to a control method for a controller for controlling air-conditioning appliance connected to a network, the control method including: executing a first application for operating the air-conditioning appliance in order to provide a first operation, the first operation being automatically controlling a temperature of the air-conditioning appliance; transmitting a first command corresponding to the first application to the air-conditioning appliance, the first command causing the air-conditioning appliance to set a temperature; executing a second application for operating the air-conditioning appliance in order to provide a second operation, the second operation being automatically controlling power consumed by the air-conditioning appliance; transmitting a second command corresponding to the second application to the air-conditioning appliance, the second command causing turning on or off power supply of the air-conditioning appliance; storing an execution log each time the first application and the second application are executed, wherein the execution log includes a first log corresponding to execution of the first application and a second log corresponding to execution of the second application, the first log including an identifier of the first operation, an identifier of the air-conditioning appliance, and first temperature information to be set for the air-conditioning appliance, and the second log including an identifier of the second operation, the identifier of the air-conditioning appliance, and information indicating whether the air-conditioning appliance is to be turned on or off; detecting that the first application and the second application are alternately executed on the air-conditioning appliance at least a predetermined number of times, based on the execution log; terminating the execution of the first application or the second application when the first application and the second application are alternately executed the at least the predetermined number; stopping the transmission of the first command to the air-conditioning appliance when the first application is terminated; and stopping the transmission of the second command to the air-conditioning appliance when the second application is terminated.

According to this configuration, it is possible to disable the execution of repetition of two mutually contracting services, that is, the service for automatically controlling the temperature and the service for automatically controlling the power consumed, on the air-conditioning equipment. The present disclosure discloses not only the control method for executing the above-described characteristic processes but also a control apparatus having a processing unit that executes the characteristic processes included in the control method. The present disclosure further discloses a computer program for causing a computer to execute the characteristic processes included in the control method. Needless to say, such a computer program can be distributed using a computer-readable non-transitory recording medium, such as a compact disc read-only memory (CD-ROM), or using a communications network, such the Internet.

The embodiments described below each represent a specific example of the present disclosure. Numerical values, shapes, constituent elements, steps, the order of steps, and so on described in the embodiments below are examples, and are not intended to limit the present disclosure. Of the constituent elements in the embodiments described below, the constituent elements not set forth in the independent claims that represent the broadest concept will be described as optional constituent elements. In all of the embodiments, the contents thereof can be combined.

First Embodiment

FIG. 1 is a diagram illustrating an overview of a home network system in a first embodiment. As illustrated in FIG. 1, a home controller 100 (a control apparatus) is connected to equipment 150 including an air conditioner 150a and a light 150b through a home network 120. The home controller 100 is further connected to an application server 140 through a wide area network 130.

The application server 140 stores a program for various services including services provided by third parties. The home controller 100 can execute a service by downloading the program from the application server 140 and executing the program.

The equipment 150 connected to the home network 120 is not limited to the air conditioner 150a and the light 150b and may be home electrical and electronic equipment, such as a refrigerator, a washing machine, a power distribution board, and a solar panel. The home network 120 may be implemented by an arbitrary network, such as a wired local area network (LAN), a wireless LAN, or a specified low-power radio network and may have a network configuration in which they are combined with each other so as to allow the equipment 150 to communicate with each other. The wide area network 130 may be implemented by an arbitrary network, such as an optical fiber network, a wireless network, or a public telephone network.

Figure 2:
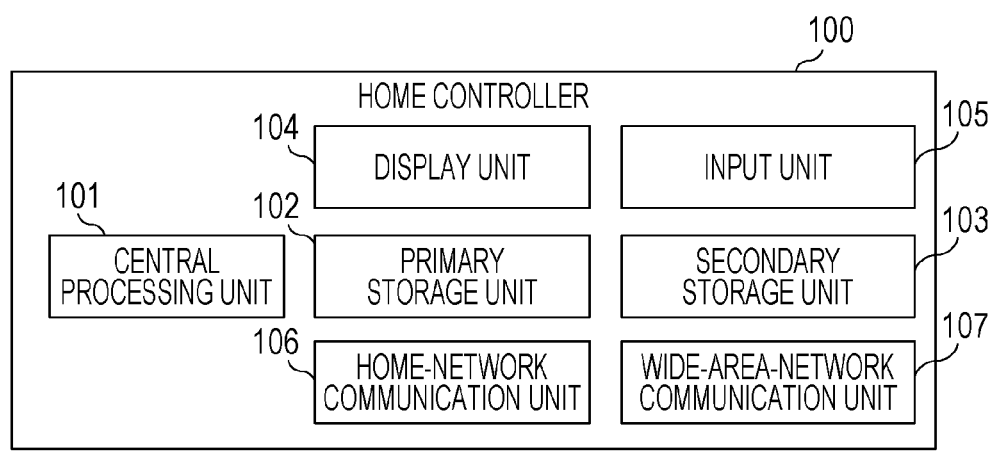
FIG. 2 is a diagram illustrating the hardware configuration of a home controller in the first embodiment.

The hardware configuration of the home controller 100 will be described with reference to FIG. 2. FIG. 2 is a diagram illustrating the hardware configuration of the home controller 100 in the first embodiment. The home controller 100 includes a central processing unit (CPU) 101, a primary storage unit 102 (a management unit) implemented by a random-access memory (RAM), a secondary storage unit 103 implemented by a ROM, a hard disk drive (HDD), and so on, a display unit 104, an input unit 105, a home-network communication unit 106, and a wide-area-network communication unit 107.

By executing a program pre-stored in the secondary storage unit 103, the central processing unit 101 downloads a service program to the secondary storage unit 103 and also loads the program stored in the secondary storage unit 103 to the service primary storage unit 102.

The primary storage unit 102 has a storage area for storing an equipment table T1, a service table T2, a state monitor table 300, and a loop candidate table 900. The primary storage unit 102 manages the equipment table T1, the service table T2, the state monitor table 300, and the loop candidate table 900.

The display unit 104 includes, for example, a liquid-crystal display (LCD) and displays a result of processing performed by the central processing unit 101 executing the program. The display unit 104 may be implemented by a display device of a tablet terminal, a digital television (DTV), or the like connected through the home network 120. The input unit 105 includes, for example, a touch panel and hardware buttons and receives an operation performed by a user.

The home-network communication unit 106 performs processing for communication with the air conditioner 150a and the light 150b through the home network 120. The wide-area-network communication unit 107 performs processing for communication with the application server 140 through the wide area network 130.

Figures 3, 4:
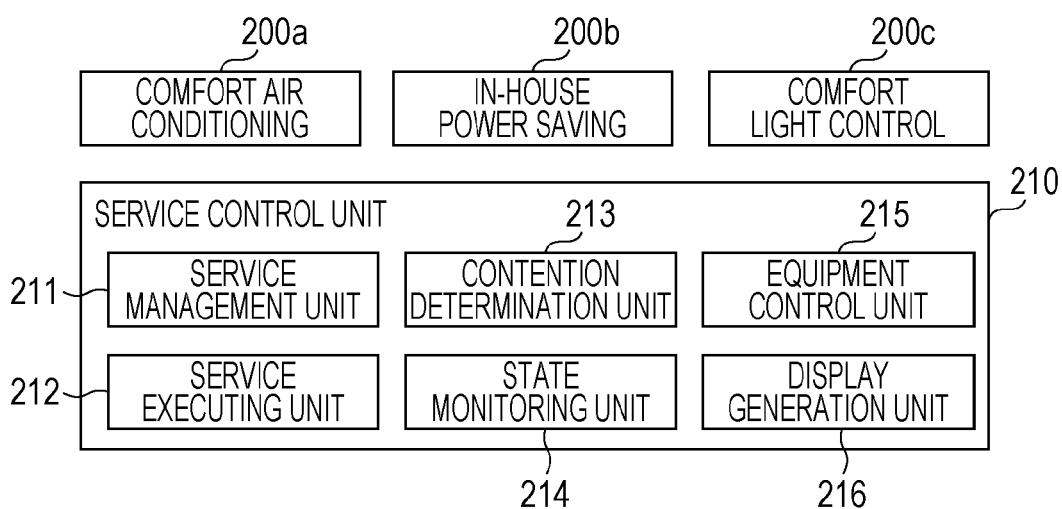
FIG. 3 is a diagram illustrating the functional configuration of the home controller in the first embodiment.
FIG. 4 illustrates one example of a state monitor table.

FIG. 3 is a diagram illustrating the functional configuration of the home controller 100 in the first embodiment. The central processing unit 101 executes a program for realizing functions of the individual blocks illustrated in FIG. 3, to thereby make it possible to implement the functional configuration illustrated in FIG. 3. The functional configuration illustrated in FIG. 3 may be realized by combining dedicated circuits that function as the individual blocks illustrated in FIG. 3.

A service control unit 210 operates as a service management unit 211 (a terminating unit), a service executing unit 212, a contention determination unit 213 (a detecting unit), a state monitoring unit 214, an equipment control unit 215, and a display generation unit 216.

Upon receiving a start request for a service from the input unit 105 through a user operation, the service management unit 211 loads, to the primary storage unit 102, a program for the service for which the start request was received and notifies the service executing unit 212 about the start request for the service. As described below, after determining a service to be terminated among services that cause the occurrence of loop control, the services being identified by the contention determination unit 213, the service management unit 211 issues a request for terminating the determined service and notifies the service executing unit 212 about the termination request.

Upon receiving the service start request from the service management unit 211, the service executing unit 212 performs startup processing for the service indicated by the start request. The service startup processing is processing in which the central processing unit 101 executes a program for the service, the program being stored in the primary storage unit 102, to thereby allow the service to execute control of the equipment 150.

Upon receiving a control request for the equipment 150 from the service after the service startup processing is performed, the service executing unit 212 outputs the control request to the equipment control unit 215. Thus, the service executing unit 212 causes the equipment control unit 215 to execute control of the equipment 150 which is indicated by the control request. Hereinafter, the service executing unit 212 receiving a control request for the equipment 150 from a service and causing the equipment control unit 215 to execute control of the equipment 150 which is indicated by the control request is referred to as "execution of a service".

Upon receiving a service termination request from the service management unit 211, the service executing unit 212 performs processing for terminating the service indicated by the termination request. The service termination processing is processing for causing the central processing unit 101 to terminate execution of the program for the service to thereby disable the execution of the service.

In the first embodiment, the service executing unit 212 can execute three services 200, that is, a comfort air conditioning service 200a, an in-house power-saving service 200b, and a comfort light control service 200c, illustrated in FIG. 3.

The comfort air conditioning service 200a automatically controls the air conditioner 150a in response to temperature changes in a room. The in-house power-saving service 200b monitors power consumed in a home and automatically controls the equipment 150, connected in the home network 120, so as to reduce the amount of power consumed. The comfort light control service 200c automatically controls the light 150b in response to illuminance changes in the room. The services 200a to 200c performs re-setting on the equipment 150 upon receiving a notification indicating a state change in the equipment 150. The services 200a to 200c can simultaneously execute control of the equipment 150 to be controlled.

The services 200a to 200c are examples of services that can be executed by the service executing unit 212, and the services that can be executed by the service executing unit 212 are not limited to the services 200a to 200c and may be various services provided by third parties. Also, the number of services that can be executed by the service executing unit 212 is not limited to three. Hereinafter, the services 200a to 200c that can be executed by the service executing unit 212 are collectively referred to as "services 200".

On the basis of information (state information) registered in the state monitor table 300 and the loop candidate table 900, which are described below, the contention determination unit 213 performs processing for detecting occurrence of loop control (repetitive control). The "occurrence of loop control" as used herein means that execution of control (first control) by one service 200 (a first service) and execution of other control (second control) by another service 200 (a second service) are repeatedly performed on the same equipment 150 a predetermined number of times or more.

Upon detecting the occurrence of loop control, the contention determination unit 213 performs processing for identifying the services 200 that cause the occurrence of the loop control. Details of processing performed by the contention determination unit 213 is described later with reference to a flowchart in FIG. 10.

The state monitoring unit 214 performs processing involving monitoring the state of the equipment 150, detecting a state change in the equipment 150, and notifying the service 200 about the detected state change. Details of processing performed by the state monitoring unit 214 are described later with reference to flowcharts illustrated in FIGS. 7 and 9.

The equipment control unit 215 interprets a control request for the equipment 150, the control request being received from the service 200, and generates a control command for causing the equipment 150 to perform control indicated by the control request, for example, by using an equipment protocol control, such as ECHONET Lite. That is, the control command indicates details of control to be performed by the equipment 150. The equipment control unit 215 transmits the generated control command to the equipment 150 via the home-network communication unit 106. The equipment 150 performs control according to the details of control indicated by the control command received from the equipment control unit 215.

The display generation unit 216 generates a message (notification information) for notifying the user that the service management unit 211 has issued a service termination request because the contention determination unit 213 detected the occurrence of loop control, and generates a notification screen including the generated message. Details of the message and the notification screen are described later with reference to FIGS. 13 and 14.

Next, the aforementioned state monitor table 300 will be described with reference to FIG. 4. FIG. 4 illustrates one example of the state monitor table 300. The state monitor table 300 is a table for managing state monitor information in which equipment identifiers (IDs) for identifying the pieces of equipment 150 connected to the home network 120 and service IDs for identifying the services 200 that monitor the states of the pieces of equipment 150 are associated with each other.

Now, a description will be given of the equipment IDs managed in the state monitor table 300. During manufacture, shipment, or the like of each piece of the equipment 150, an equipment name and an equipment ID are stored in a nonvolatile memory, such as a ROM, in the equipment 150 as information for identifying the corresponding equipment 150. The equipment ID is information, such as a media access control (MAC) address, for uniquely identifying the equipment 150. For example, during start of the operation of the equipment 150, the equipment name and the equipment ID stored in the nonvolatile memory are loaded to a memory, such as a RAM, included in the equipment 150.

The equipment ID is not limited to a MAC address and may be any information that can uniquely identify the equipment 150 connected to the home network 120. For example, the equipment ID may be an equipment-unique value defined by an equipment communication protocol for performing remote control through the home network 120 (e.g., an identification number, a production number, or the like defined by the ECHONET Lite standard as a property value of the equipment 150).

Alternatively, upon recognizing that any of the equipment 150 is connected to the home network 120, the home controller 100 may generate an equipment name indicating the type of recognized equipment 150, generate an equipment ID that is information that allows the recognized equipment 150 to be uniquely identify (e.g., the date and time when the equipment 150 was recognized), and transmit the generated equipment name and equipment ID to the equipment 150. Correspondingly, the equipment 150 may store the received equipment name and equipment ID in a memory, such as the RAM thereof.

Figure 5:
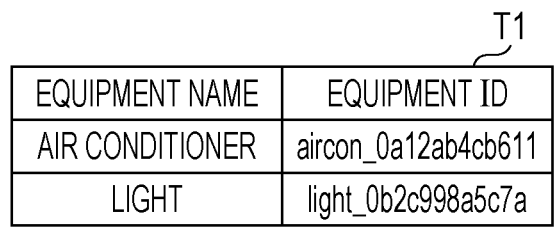
FIG. 5 illustrates one example of an equipment table.

FIG. 5 illustrates one example of the equipment table T1. The equipment table T1 is a table for managing the equipment names and the equipment IDs of the pieces of equipment 150 connected to the home network 120. Upon recognizing that any of the equipment 150 is connected to the home network 120, the home controller 100 obtains the equipment name and the equipment ID from the equipment 150, and registers the equipment name and the equipment ID in the equipment table T1. Upon failing to obtain the equipment name and the equipment ID from the equipment 150, the home controller 100 generates an equipment name and an equipment ID, registers the generated equipment name and equipment ID in the equipment table T1, and transmits the equipment name and equipment ID to the equipment 150, as described above.

For example, "air conditioner" is registered in the equipment table T1 illustrated in FIG. 5 as the equipment name of the air conditioner 150a and "aircon_0a12ab4cb611" is registered as the equipment ID of the air conditioner 150a. Equipment names and equipment IDs in the following description are assumed to be the equipment names and the equipment IDs illustrated in FIG. 5.

Next, a description will be given of service IDs managed in the state monitor table 300. During development of a program for each service 200, a service name and a service ID generated by the provider or creator of the service 200 are incorporated into the program as information for identifying the service 200. The service ID is information that allows the service 200 to be uniquely identified.

When no service ID is incorporated in the program for the service 200, information that allows the service 200 to be uniquely identified (e.g., the date and time when the service 200 is started) may be generated as the service ID for the service 200 when the home controller 100 starts the service 200.

Figure 6:
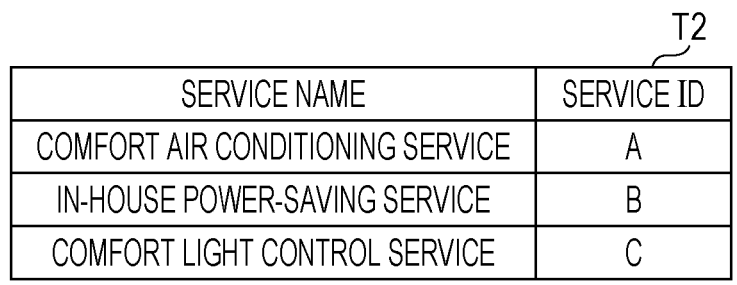
FIG. 6 illustrates one example of a service table.

FIG. 6 illustrates one example of the service table T2. The service table T2 is a table for managing the service names and the service IDs of the services 200 executed by the home controller 100. When any of the services 200 is started, the home controller 100 registers the service name and the service ID, incorporated in the program for the service 200, in the service table T2. When no service ID is incorporated in the program for the service 200, the home controller 100 generates a service ID and registers the generated service ID in the service table T2, as described above.

For example, "comfort air conditioning service" is registered in the service table T2 illustrated in FIG. 6 as the service name of the comfort air conditioning service 200a, and "A" is registered as the service ID thereof. Service names and service IDs in the description below are assumed to be the service names and the service IDs illustrated in FIG. 6.

Figure 7:
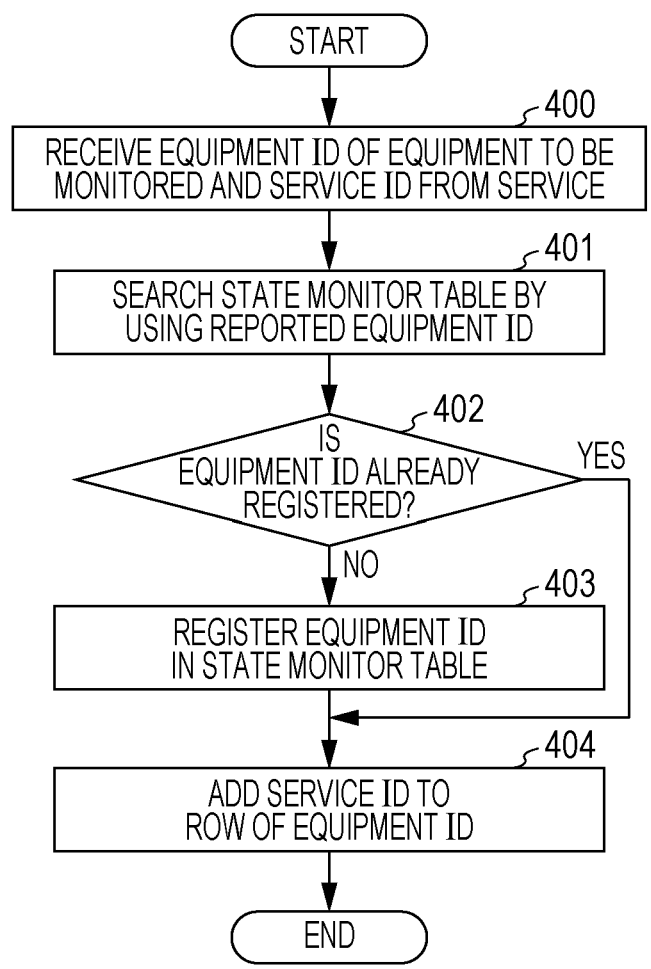
FIG. 7 is a flowchart illustrating one example of a processing flow of registering information in the state monitor table in the first embodiment.

Next, a flow of registering information in the state monitor table 300, the registration being performed by the state monitoring unit 214, will be described with reference to FIG. 7. FIG. 7 is a flowchart illustrating one example of a processing flow of registering information in the state monitor table 300 in the first embodiment. When the service executing unit 212 performs processing for starting any of the services 200, this service 200 calls an equipment-state monitoring application program interface (API) provided by the service control unit 210. The equipment-state monitoring API is the so-called callback function. The equipment-state monitoring API receives, from the service 200 by which it was called, the equipment ID of the equipment 150 whose state is to be monitored by the service 200, and the service ID of the service 200 and reports the received equipment ID and service ID to the service control unit 210.

Upon receiving the equipment ID and service ID reported from the equipment-state monitoring API (step 400), the state monitoring unit 214 performs searching to determine whether or not the reported equipment ID is registered in the state monitor table 300 (step 401).

If the reported equipment ID is already registered in the state monitor table 300 (YES in step 402), the state monitoring unit 214 adds the service ID reported in step 400 as a service ID corresponding to the registered equipment ID (step 404). If the reported equipment ID is not yet registered in the state monitor table 300 (NO in step 402), the state monitoring unit 214 registers the reported equipment ID in the state monitor table 300 (step 403) and adds the service ID reported in step 400 as a service ID corresponding to the registered equipment ID (step 404).

As described above, the state monitoring unit 214 registers, in the state monitor table 300, the state monitor information in which the equipment ID for identifying the corresponding piece of equipment 150 and the service ID(s) for identifying one or more services 200 that are monitoring the state of the piece of equipment 150 are associated with each other.

For example, state monitor information in which the equipment ID "aircon_0a12ab4cb611" and two service IDs "A" and "B" are associated with each other is registered in the state monitor table 300 illustrated in FIG. 4. This state monitor information indicates a result obtained by executing step 403 when the startup processing of the service 200 that executes control of the equipment 150 with the equipment ID "aircon_0a12ab4cb611" and that is identified with the service ID "A" was performed and then executing step 404 when the startup processing of the service 200 that executes control of the equipment 150 having the same equipment ID and that is identified with the service ID "B" was performed.

Figure 8:
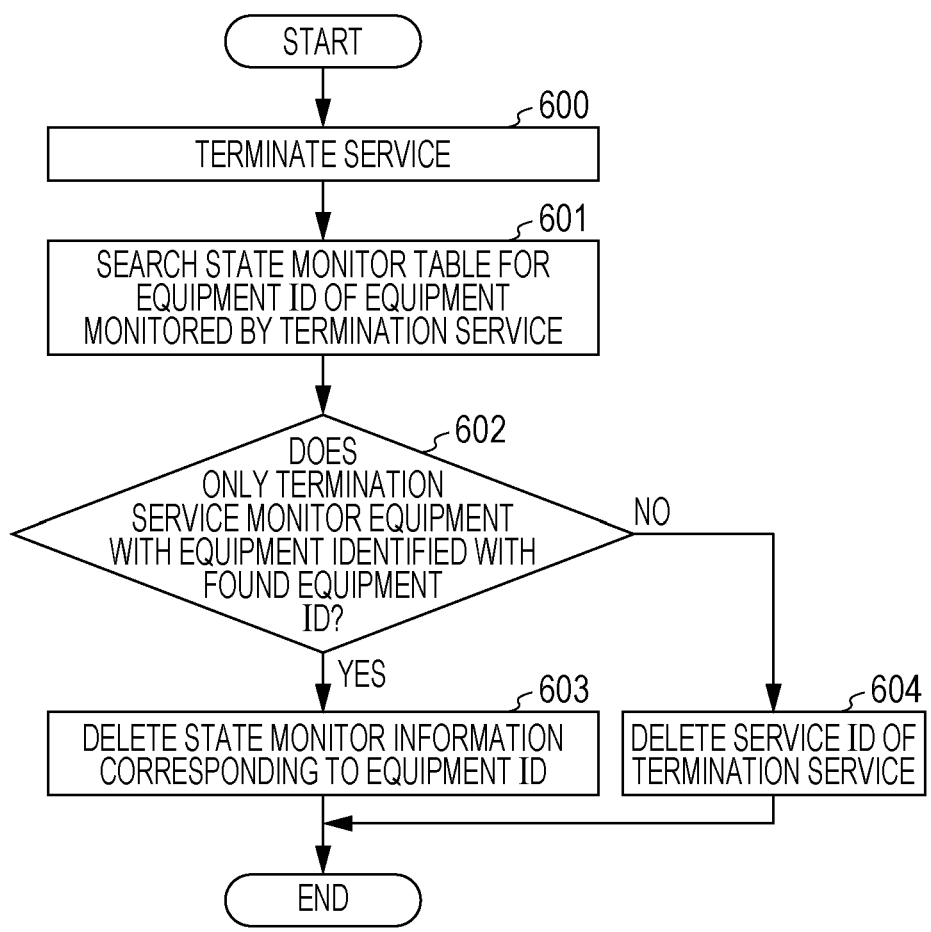
FIG. 8 is a flowchart illustrating one example of a processing flow of deleting information from the state monitor table in the first embodiment.

Next, a flow of deleting information from the state monitor table 300, the deletion being performed by the state monitoring unit 214, will be described with reference to FIG. 8. FIG. 8 is a flowchart illustrating one example of a processing flow of deleting information from the state monitor table 300 in the first embodiment. When the service executing unit 212 performs processing for terminating the service 200 (step 600), the state monitoring unit 214 searches for the equipment ID of the equipment 150 whose state was monitored by the service 200 on which the termination processing was performed (this service 200 is hereinafter referred to as a "termination service 200") (step 601). More specifically, in step 601, the state monitoring unit 214 searches the state monitor table 300 for the equipment ID associated with the service ID of the termination service 200.

Next, the state monitoring unit 214 determines whether or not the service(s) 200 that monitor(s) the state of the equipment 150 identified with the equipment ID found in step 601 is (are) only the above-described termination service (step 602). More specifically, in step 602, the state monitoring unit 214 determines whether or not the service ID(s) associated with the equipment ID included in the state monitor table 300 and found in step 601 is (are) only the service ID of the termination service 200.

If the service ID found in step 601 is only the service ID of the termination service 200 (YES in step 602), the state monitoring unit 214 deletes, from the state monitor table 300, the state monitor information in which the equipment ID and the service ID of the termination service 200 are associated with each other (step 603). In the services ID found in step 601 are not only the service ID of the termination service 200 (NO in step 602), the state monitoring unit 214 deletes only the service ID of the termination service 200 from the service IDs associated with the equipment ID (step 604).

For example, it is assumed that the state monitor information is registered in the state monitor table 300, as illustrated in FIG. 4. That is, it is assumed that two services identified with service IDs "A" and B" are monitoring the state of the equipment 150 identified with the equipment ID "aircon_0a12ab4cb611". It is also assumed that two services identified with service IDs "B" and "C" are monitoring the state of the equipment 150 identified with an equipment ID "light_0b2c998a5c7a".

Now, it is assumed that processing for terminating the service 200 identified with the service ID "A" is performed. In this case, the equipment ID "aircon_0a12ab4cb611" corresponding to the service ID "A" is found in step 601. In step 602, it is determined that the service IDs "A" and "B" associated with the equipment ID are not only the service ID "A" of the termination service 200. As a result, step 604 is performed, so that the state monitor information in which the equipment ID "aircon_0a12ab4cb611" and the service ID "B" are associated with each other remains registered in the state monitor table 300.

Thus, on the basis of the state monitor information, it is possible to appropriately recognize that the state of the equipment 150 identified with the equipment ID "aircon_0a12ab4cb611" is currently monitored by only the service 200 identified with the service ID "B".

It is assumed that, subsequently, processing for terminating the in-house power-saving service 200*b* identified with the service ID "B" is performed. In this case, two equipment IDs "aircon_0a12ab4cb611" and "light_0b2c998a5c7a" corresponding to the service ID "B" are found in step 601. Thus, when a plurality of equipment IDs are found in step 601, processes in step 602 and the subsequent step are performed on each of the found equipment IDs.

Since the service ID associated with the equipment ID "aircon_0a12ab4cb611" is only "B" in step 602 performed on the equipment ID, step 603 is performed. Thus, the state monitor information in which the equipment ID and the service ID "B" of the termination service are associated with each other is deleted from the state monitor table 300. As a result, no state monitor information including the equipment ID "aircon_0a12ab4cb611" exists in the state monitor table 300. Thus, on the basis of the state monitor table 300, it is possible to appropriately recognize that there is no service 200 that is currently monitoring the state of the equipment 150 identified with the equipment ID "aircon_0a12ab4cb611".

On the other hand, in step 602 performed on the equipment ID "light_0b2c998a5c7a", since the service IDs associated with this equipment ID are "C" and "B", it is determined that the service IDs associated with the equipment ID are not only the service ID "B" of the termination service. As a result, step 604 is performed, so that the state monitor information in which the equipment ID "light_0b2c998a5c7a" and the service ID "C" are associated with each other remains registered in the state monitor table 300. Thus, on the basis of the state monitor information, it is possible to appropriately recognize that the state of the equipment 150 identified with the equipment ID "light_0b2c998a5c7a" is currently monitored by only the service 200 identified with the service ID "C".

Figure 9:
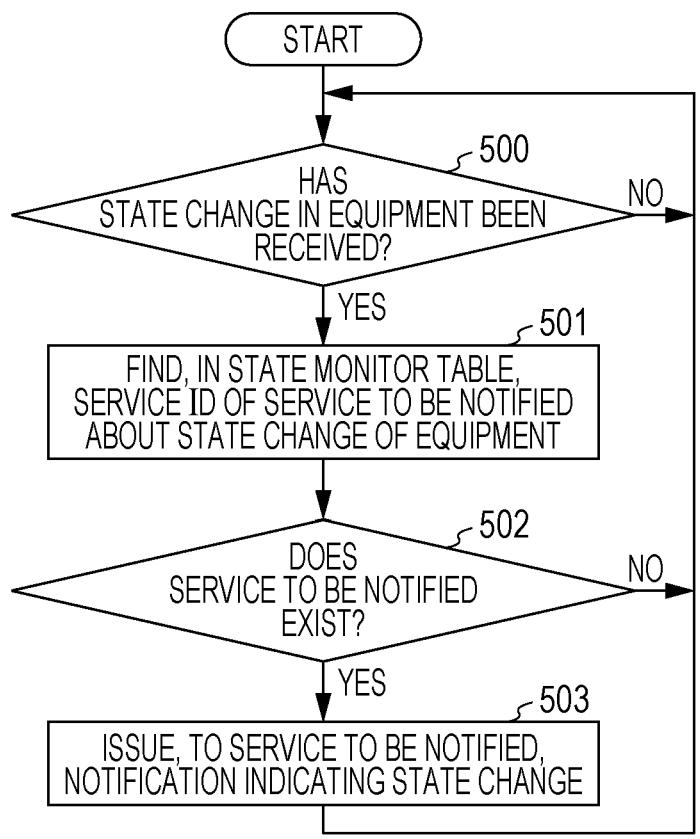
FIG. 9 is a flowchart illustrating one example of a processing flow of monitoring a state change in equipment and reporting the state change to a service in the first embodiment.

Next, a flow of reporting a state change in the equipment 150, the reporting being performed by the state monitoring unit 214, will be described with reference to FIG. 9. FIG. 9 is a flowchart illustrating one example of a processing flow of monitoring a state change in the equipment 150 and reporting the state change to the service 200 in the first embodiment. When any of the equipment 150 connected to the home network 120 is re-set, for example, by an operation with a genuine remote control of the equipment 150 or by execution of the service 200, the equipment 150 issues, to the service control unit 210, a notification indicating that the state of the equipment 150 has changed.

The state monitoring unit 214 enters a reception-waiting state until receiving a state change notification from any of the equipment 150 connected to the home network 120 (NO in step 500).

Upon receiving a state change notification from any of the equipment 150 (YES in step 500), the state monitoring unit 214 detects that the state of the equipment 150 has changed. In this case, the state monitoring unit 214 searches for the service ID associated with the equipment ID of the equipment 150 by referring to the state monitor table 300. As a result, the state monitoring unit 214 finds the service ID of the service 200 to be notified about the state change of the equipment 150 (step 501).

If the service ID of the service 200 to be notified exists in the state monitor table 300 (YES in step 502), the state monitoring unit 214 issues, to the service 200 to be notified which is identified with the service ID, a notification indicating the state of the equipment 150 has changed (step 503). Subsequently, the state monitoring unit 214 returns to step 500 and enters the reception-waiting state until receiving a new state change notification from any of the equipment 150. If the service ID of the service 200 to be notified does not exist in the state monitor table 300 (NO in step 502), the state monitoring unit 214 returns to step 500 and enters the reception-waiting state until receiving a new state change notification from any of the equipment 150.

Instead of the equipment 150 playing the main role of issuing a notification indicating a state change, the state monitoring unit 214 may periodically send, to the equipment 150 identified with the equipment ID registered in the state monitor table 300, an inquiry about whether or not a state change has occurred. Correspondingly, upon receiving the inquiry, the equipment 150 may return a response indicating that a state change has occurred, when re-setting was performed on the equipment 150 after receiving a last inquiry.

Figure 10:
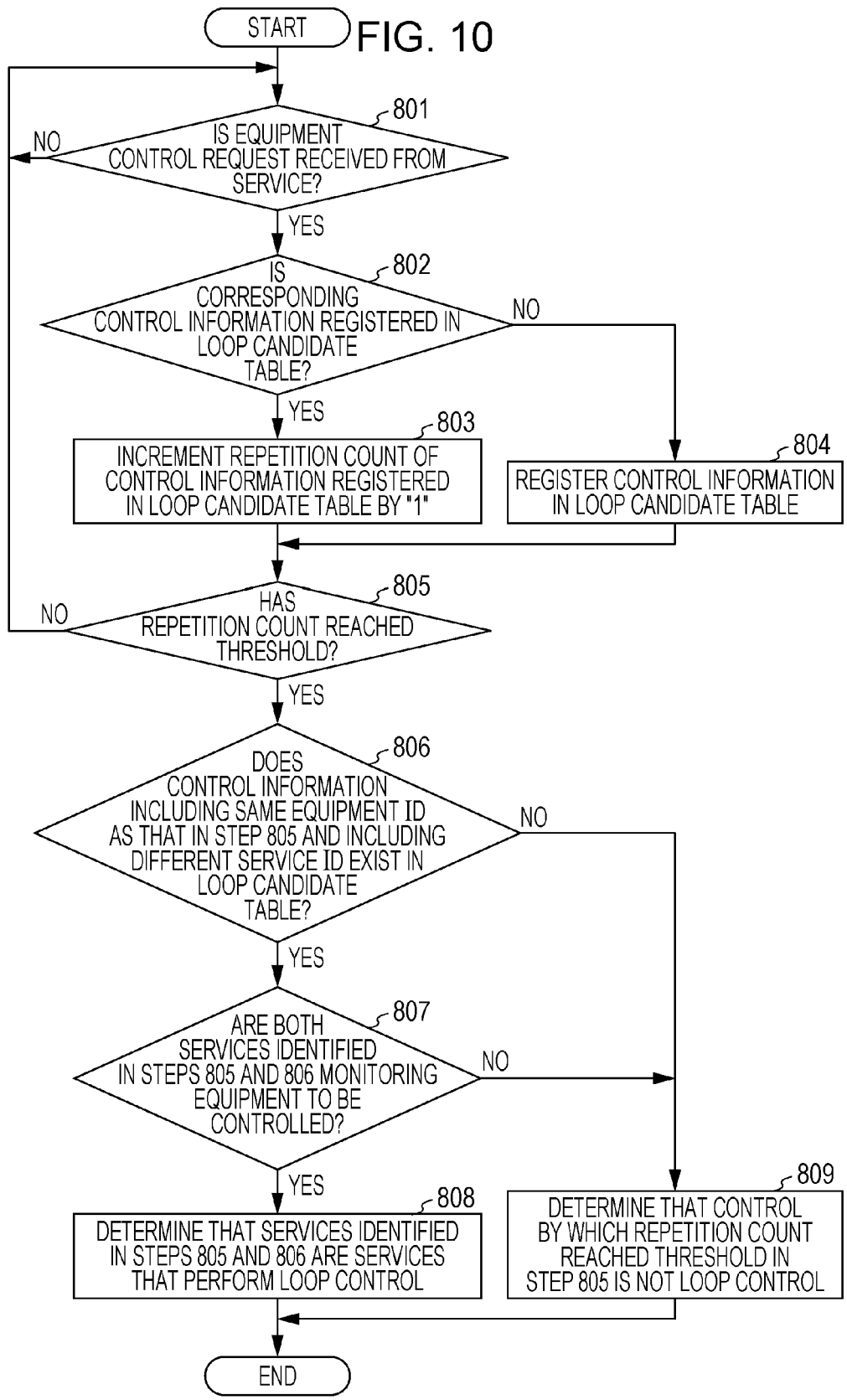
FIG. 10 is a flowchart illustrating one example of a processing flow of detecting that loop control is occurring.

Next, a flow of processing performed by the contention determination unit 213 will be described with reference to FIG. 10. FIG. 10 is a flowchart illustrating one example of a processing flow of detecting that loop control is occurring. It is assumed that the service executing unit 212 receives a control request for the equipment 150 from any of the services 200 and executes the service 200 (YES in step 801). In this case, the contention determination unit 213 determines whether or not control information corresponding to the control request is registered in the loop candidate table 900 (step 802).

Figures 11, 12:
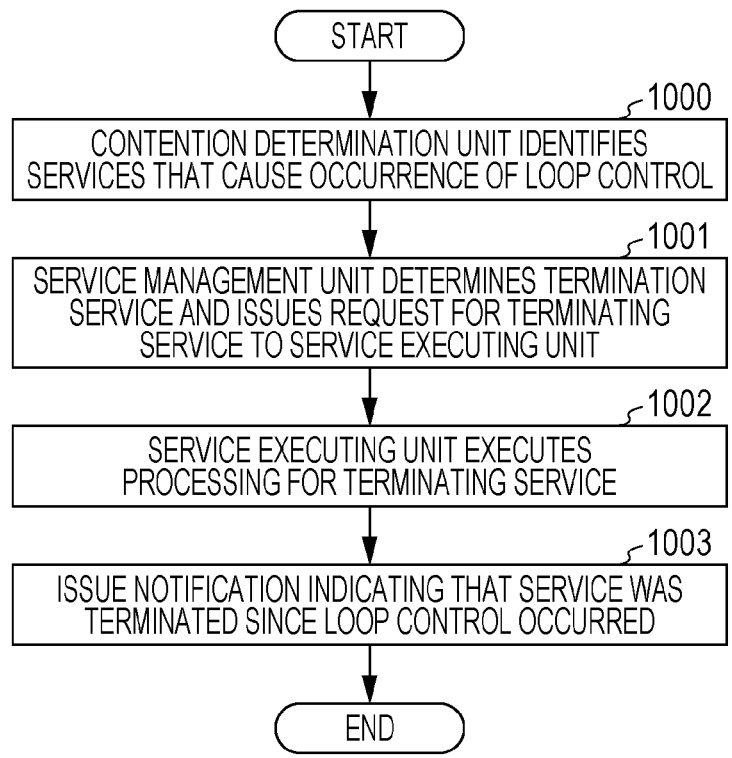
FIG. 11 illustrates one example of a loop candidate table.
FIG. 12 is a flowchart illustrating one example of a processing flow of disabling loop control in the first embodiment.

FIG. 11 illustrates one example of the loop candidate table 900. The loop candidate table 900 is a table for managing control information in which a service ID 901 for identifying each service 200 executed upon issuance of a control request, an equipment ID 902 of the equipment 150 controlled by the corresponding service 200, a control command 903 indicating details of the control of the equipment 150, and the number of times the control was executed (which is hereinafter referred to as a "repetition count 904") are associated with each other.

If control information corresponding to the control request received in step 801 is already registered in the loop candidate table 900 (YES in step 802), the contention determination unit 213 increments the repetition count 904 of the registered control information by "1" (step 803). By doing so, the contention determination unit 213 updates the registered control information.

It is assumed that, for example, the service executing unit 212 has received, four times from the comfort air conditioning service 200*a* with the service ID "A", a control request for performing control to set the air conditioner 150*a* with the equipment ID "aircon_0a12ab4cb611" to an operation for heating to 25° C. That is, it is assumed that control information (the service ID 901 "A", the equipment ID 902 "aircon_0a12ab4cb611", the control command 903 "heating to 25° C.", and the repetition count 904 "4") corresponding to the control request is already registered in the loop candidate table 900. In this case, it is assumed that, in step 801, the service executing unit 212 receives the same control request again.

In this case, since the control information corresponding to the control request received in step 801 is already registered in the loop candidate table 900 (YES in step 802), step 803 is performed. That is, the contention determination unit 213 updates the control information corresponding to the control request already registered in the loop candidate table 900 to new control information (the service ID 901 "A", the equipment ID 902 "aircon_0a12ab4cb611", the control command 903 "heating to 25° C.", and the repetition count 904 "5"), as illustrated in FIG. 11.

On the other hand, if the control information corresponding to the control request received in step 801 is not yet registered (NO in step 802), the contention determination unit 213 registers, in the loop candidate table 900, control information (the service ID 901, the equipment ID 902, the control command 903, and the repetition count 904) corresponding to the control request (step 804). The contention determination unit 213 sets "1" for the repetition count 904 of the control information registered in step 804.

For example, it is assumed that the service executing unit 212 has not received the control request for the equipment 150 from the comfort light control service 200*c* with the service ID "C". That is, it is assumed that no control information including the service ID "C" has not been registered in the loop candidate table 900. In this case, it is assumed that, in step 801, the service executing unit 212 receives, from the comfort light control service 200*c* with the service ID "C", a control request for performing control for turning (putting) on the light 150*b* with the equipment ID "light_0b2c998a5c7a".

In this case, since control information corresponding to the control request received in step 801 is not yet registered in the loop candidate table 900 (NO in step 802), step 804 is performed. That is, the contention determination unit 213 registers, in the loop candidate table 900, control information (the service ID 901 "C", the equipment ID 902 "light_0b2c998a5c7a", the control command 903 "ON", and the repetition count 904 "1") corresponding to the control request.

After registering or updating the control information, the contention determination unit 213 determines whether or not the repetition count 904 included in the control information has reached a pre-defined threshold (a predetermined number). If the repetition count 904 has reached the threshold (YES in step 805), the contention determination unit 213 determines whether or not control information (hereinafter referred to as "determination-target control information") including the same equipment ID 902 as that of the equipment ID 902 in the control information and including a service ID 901 different from the service ID 901 in the control information exists in the loop candidate table 900 (step 806). By doing so, the contention determination unit 213 determines whether or not two or more services 200 that have ever controlled the equipment 150 identified with the aforementioned same equipment ID 902 exist.

For example, it is assumed that control information is registered in the loop candidate table 900, as illustrated in FIG. 11. The aforementioned threshold is assumed to be 5. It is further assumed that, in step 801, the service 200 identified with the service ID "A" is executed, and in step 805, the contention determination unit 213 determines that the repetition count 904 "5" included in the control information corresponding to the service ID "A" has reached 5.

In this case, in step 806, on the basis of two pieces of control information shown in the first and second rows illustrated in FIG. 11, the contention determination unit 213 determines that determination-target control information including the same equipment ID 902 as the equipment ID 902 "aircon_0a12ab4cb611" in the control information and including the service ID 901 "B" different from the service ID 901 "A" in the control information exists (YES in step 806). By doing so, the contention determination unit 213 determines that there are two services 200 that have ever controlled the equipment 150 identified with the equipment ID 902 "aircon_0a12ab4cb611", that is, the service 200 identified with the service ID "A" and executed in step 801 and the service 200 identified with the service ID "B".

If no determination-target control information exists in the loop candidate table 900 (NO in step 806), the equipment 150 has never been controlled by two or more services 200. Thus, the contention determination unit 213 determines that loop control due to the service 200 that was executed in step 801 and that corresponds to the control information in which the repetition count 904 reached the threshold in step 805 is not occurring (step 809).

On the other hand, it is assumed that the determination-target control information exists in the loop candidate table 900 (YES in step 806). In this case, by referring to the state monitor table 300, the contention determination unit 213 determines both the service 200 determined (identified) with the service ID 901 in the control information in which the repetition count 904 was determined to have reached the threshold in step 805 (this service 200 is hereinafter referred to as the "service 200 identified in step 805) and the service 200 determined (identified) with the service ID 901 in the determination-target control information (this service 200 is hereinafter referred to as the" service 200 identified in step 806") are monitoring the state of the equipment 150 identified with the same equipment ID 902 (this equipment is hereinafter referred to as the "same equipment 150") (step 807). By doing so, the contention determination unit 213 determines whether or not there is a possibility that both the service 200 identified in step 805 and the service 200 identified in step 806 are currently controlling the same equipment 150.

More specifically, in step 807, if the contention determination unit 213 refers to the state monitor table 300 and recognizes that the state monitor information including the service ID of the service 200 identified in step 805 includes the same equipment ID 902 and the state monitor information including the service ID of the service 200 identified in step 806 also includes the same equipment ID 902, the contention determination unit 213 determines that both of the services 200 are monitoring the state of the same equipment 150 (YES in step 807).

On the other hand, if at least one of the state monitor information including the service ID of the service 200 identified in step 805 and the state monitor information including the service ID of the service 200 identified in step 806 does not include the same equipment ID 902, the contention determination unit 213 determines that at least one of the services 200 is not monitoring the state of the same equipment 150 (NO in step 807).

For example, it is assumed that the state monitor information is registered in the state monitor table 300, as illustrated in FIG. 4. In addition, it is assumed that the aforementioned same equipment ID 902 is "aircon_0a12ab4cb611", the service ID of the service 200 identified in step 805 is "A", and the service ID of the service 200 identified in step 806 is "B", as in the specific example described in step 806.

In this case, in the state monitor table 300, the state monitor information (the first row in FIG. 4) including the service ID "A" of the service 200 identified in step 805 includes the same equipment ID 902 "aircon_0a12ab4cb611", and the state monitor information (the first row in FIG. 4) including the service ID "B" of the service 200 identified in step 806 also includes the same equipment ID 902 "aircon_0a12ab4cb611". Thus, the contention determination unit 213 determines that the two services 200 are monitoring the state of the same equipment 150.

Now, it is assumed that the contention determination unit 213 determines that at least one of the two services 200 is not monitoring the state of the same equipment 150 (NO in step 807). In this case, it can be thought that the possibility that the two services 200 are simultaneously controlling the same equipment 150 is not high. Thus, in this case, the contention determination unit 213 determines that loop control due to the control that was performed in step 801 and that corresponds to the control information in which the repetition count 904 reached the threshold in step 805 is not occurring (step 809).

On the other hand, it is assumed that the contention determination unit 213 determines that the two services 200 are monitoring the state of the same equipment 150 (YES in step 807). In this case, it can be thought that there is a high possibility that the two services 200 are simultaneously controlling the same equipment 150. Thus, in this case, the contention determination unit 213 detects that loop control is occurring in which the repetition of the execution of control (a first control) on the same equipment 150, the first control being performed by the service 200 (a first service) identified in step 805, and the execution of control (a second control) on the same equipment 150, the second control being performed by the service 200 (a second service) identified in step 806, is performed a number of times indicated by the threshold or more. The contention determination unit 213 then identifies the two services 200, identified in steps 805 and 806, as the services 200 that cause the occurrence of the loop control (step 808).

For example, it is assumed that, in step 801, the service executing unit 212 receives, from the comfort air conditioning service 200a with the service ID "A", a control request for performing control to set the air conditioner 150a with the equipment ID "aircon_0a12ab4cb611" to an operation for heating to 25° C. It is further assumed that, immediately before step 805 is executed, the control information illustrated in FIG. 11 is registered in the loop candidate table 900, and the state monitor information illustrated in FIG. 4 is registered in the state monitor table 300. It is also assumed that the threshold used in step 805 is 5.

In this case, since the repetition count in the control information corresponding to the control request received in step 801 (i.e., the control information including the service ID 901 "A") is "5", in step 805, the contention determination unit 213 determines that the repetition count has reached the threshold. In this case, in step 806, the contention determination unit 213 determines that determination-target control information including the same equipment ID 902 as the equipment ID 902 "aircon_0a12ab4cb611" in the control information and including the service ID 901 "B" different from the service ID 901 "A" in the control information exists in the loop candidate table 900.

In step 807, by referring to the state monitor table 300, the contention determination unit 213 determines that the two services 200 identified in steps 805 and 806 are monitoring the state of the same equipment 150 identified with the equipment ID "aircon_0a12ab4cb611".

In this case, in step 808, the contention determination unit 213 detects that loop control is occurring in which the repetition of the execution of control performed by the service 200 identified in step 805 and the execution of control performed by the service 200 identified in step 806 is performed five times or more. The contention determination unit 213 then identifies the two services 200, identified in steps 805 and 806, as the services 200 that cause the occurrence of the loop control.

With the above-described processing performed by the contention determination unit 213, the equipment 150 that is repeatedly controlled a number of times that is larger than or equal to the threshold can be identified with high accuracy, based on the control information indicating details of the control that the executed service 200 performs on the equipment 150. In addition, whether or not the state of the identified equipment 150 is also currently being monitored by two or more services can be determined with high accuracy, based on the state monitor information.

When it is determined based on the state monitor information that the state of the identified equipment 150 is also currently being monitored by two or more services 200, it is possible to accurately detect that loop control is currently occurring, assuming that the control of the identified equipment 150 is currently being performed by the two or more services 200 a number of times that is larger than or equal to the threshold.

Next, processing when the contention determination unit 213 detects the occurrence of loop control will be described with reference to FIG. 12. FIG. 12 is a flowchart illustrating one example of a processing flow of disabling loop control in the first embodiment.

When the contention determination unit 213 identifies the services 200 that cause the occurrence of loop control (step 1000), in accordance with the flow illustrated in FIG. 10, the service management unit 211 determines, as the service 200 to be terminated (hereinafter referred to as the "termination service 200"), the service 200 identified by the contention determination unit 213 in step 805 and included in the services 200 identified in step 1000. The service management unit 211 then issues a request for terminating the determined termination service 200 and outputs the termination request to the service executing unit 212 (step 1001). Upon receiving the output termination request, the service executing unit 212 executes processing for terminating the termination service 200 indicated by the termination request (step 1002).

When the service executing unit 212 executes the processing for terminating the termination service 200, the state monitoring unit 214 deletes the state monitor information registered in the state monitor table 300 and including the service ID of the termination service 200 (step 603) or deletes the service ID of the termination service 200 from the state monitor information (step 604) in accordance with the processing flow illustrated in FIG. 8.

Figure 13:
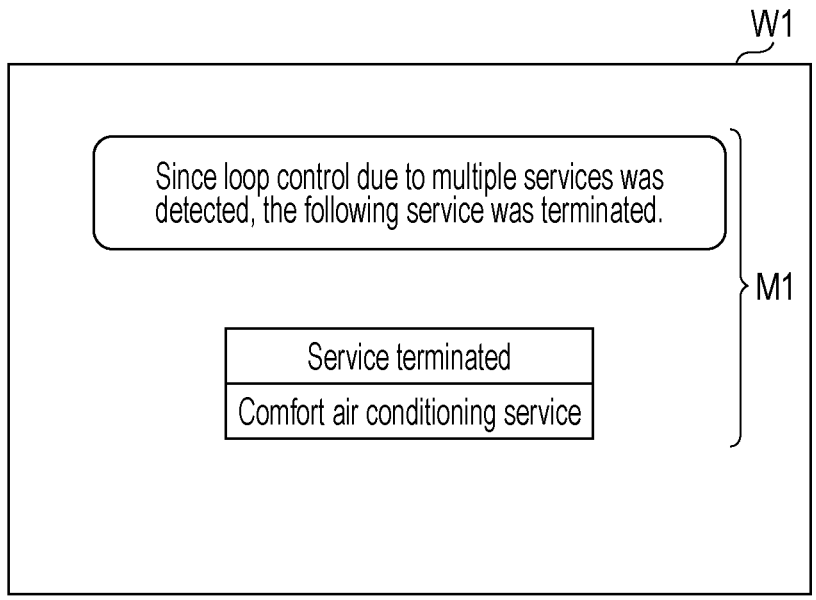
FIG. 13 illustrates one example of a notification screen.

Subsequently, the display generation unit 216 generates (issues) a message (notification information) for notifying the user that the termination service 200 was terminated (i.e., a request for terminating the termination service 200 was issued) since the occurrence of loop control was detected through reference to the service table T2 (FIG. 6). The display generation unit 216 then generates a notification screen W1 including the generated message M1, as illustrated in FIG. 13, and causes the display unit 104 to display the generated notification screen W1 (step 1003). By doing so, the display generation unit 216 notifies the user that the termination service 200 was terminated since the occurrence of the loop control was detected.

The notification screen W1 illustrated in FIG. 13 is one example, and the screen configuration may be appropriately modified as long as it is possible to notify the user that the termination service 200 was terminated since the loop control was performed. For example, the notification screen W1 may be implemented by a dialog screen or pop-up screen including the message M1 and may be displayed superimposed on an already displayed screen on the display unit 104.

Also, before the service management unit 211 outputs the request for terminating the termination service 200 to the service executing unit 212 in step 1001 (FIG. 12), the control information corresponding to the termination service 200, the control information being registered in the loop candidate table 900 (FIG. 11) may be saved to the primary storage unit 102.

Figure 14:
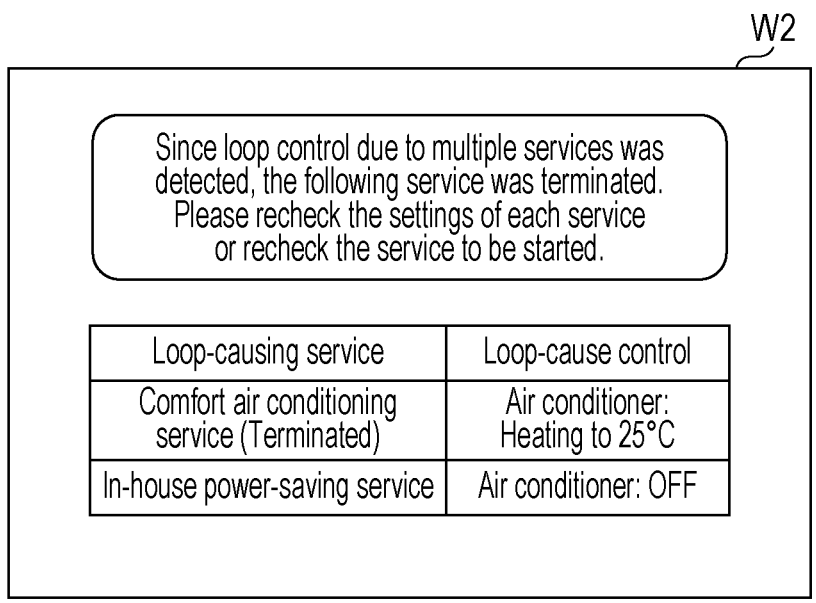
FIG. 14 illustrates another example of the notification screen.

In addition, in step 1003 (FIG. 12), by referring to the control information corresponding to the termination service 200 and saved to the primary storage unit 102, the equipment table T1 (FIG. 5), the service table T2 (FIG. 6), and the loop candidate table 900 (FIG. 11), the display generation unit 216 may generate a message including, in addition to the above-described message M1, the service names of the services 200 that were identified by the contention determination unit 213 and that cause the occurrence of the loop control, the equipment name of the equipment 150 that was controlled by the identified services 200 and on which the loop control is occurring, and a control command used for controlling the equipment 150. The display generation unit 216 may then generate a notification screen W2 including the generated message, as illustrated in FIG. 14, instead of the notification screen W1 illustrated in FIG. 13 and may cause the display unit 104 to display the generated notification screen W2.

Also, the message to be generated by the display generation unit 216 in step 1003 after this modification is made does not necessarily have to include the equipment name of the equipment 150 on which the loop control is occurring and the control command used for controlling the equipment 150. Correspondingly, a "loop-cause control" field may be eliminated from the notification screen W2 illustrated in FIG. 14.

With this configuration, it is possible to provide a clue to rechecking equipment control, performed by the termination service 200, so as to prevent the occurrence of loop control. As a result, the user can easily recheck the equipment control performed by the services.

In step 1001, the service management unit 211 may also determine, as the termination service 200, the service 200 identified by the contention determination unit 213 in step 806 or may determine, as termination services 200, all of the services 200 identified by the contention determination unit 213 in steps 805 and 806.

Also, in step 1001, the service management unit 211 may be adapted to determine the termination service(s) 200, based on the order in which the services 200 were started.

For example, in step 1001, the service management unit 211 may determine, as the termination service 200 with higher priority, the service 200 that was started earlier among the services 200 identified by the contention determination unit 213, assuming that the service 200 that was most recently started is the service 200 that the user wishes to use the most. In this case, it is possible to disable the loop control without terminating the service 200 that was most recently started and that the user wishes to use.

Alternatively, in step 1001, the service management unit 211 may determine, as the termination service 200 with higher priority, the service 200 that was started later among the services 200 identified by the contention determination unit 213, assuming that the user wishes to continuously use the service 200 that is currently operating. In this case, it is possible to disable the loop control without terminating the service 200 that the user wishes to continuously use. Thus, while continuously using the service 200 that is currently operating, as desired, the user can take measures for preventing the occurrence of the loop control, for example, by rechecking details of the equipment control performed by the service 200 that was started later or by rechecking a service that is to be started.

The home controller 100 may be adapted so that, for example, by operating the input unit 105, the user can set the priority of the service 200 that the service management unit 211 determines as the termination service 200 in step 1001.

In this case, when the user sets the priority of the service 200 that he or she does not want to terminate to low, it is possible to prevent a termination request from being issued to the service 200 he or she does not want to terminate, even when the loop control occurs.

Figure 15:
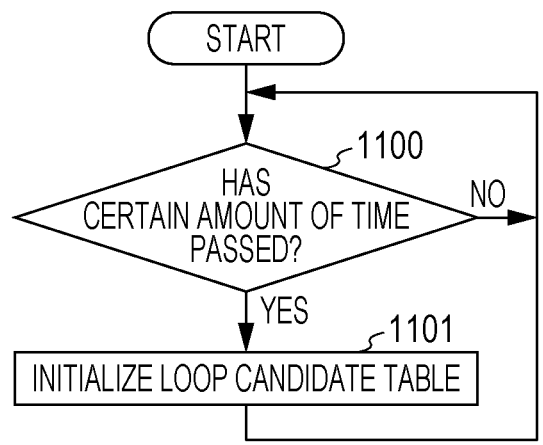
FIG. 15 is a flowchart illustrating one example of a processing flow of initializing the loop candidate table in the first embodiment.

In addition, the loop candidate table 900 may be periodically initialized. FIG. 15 is a flowchart illustrating one example of a processing flow of initializing the loop candidate table 900 in the first embodiment. Specifically, as illustrated in FIG. 15, each time a preset certain amount of time passes (YES in step 1100), the contention determination unit 213 initializes the loop candidate table 900 to delete all of the control information registered in the loop candidate table 900 (step 1101). The certain amount of time may have a predetermined fixed value or may be adapted so that the user can change the value thereof to an arbitrary value, for example, by operating the input unit 105.

In step 1101, the contention determination unit 213 may delete only the control information corresponding to a pre-defined service 200 (hereinafter referred to as a "deletion-target service 200"), that is, only control information including the service ID 901 for identifying the deletion-target service 200, instead of initializing the loop candidate table 900.

For example, it can be thought that a service 200 that is not terminated for a long time after being started and that controls the equipment 150 only once a day, like a service 200 that turns on power supply of the air conditioner 150*a* at 6:00 every morning or a service 200 that turns off the power supply of the air conditioner 150*a* at 22:00 every night, does not cause the occurrence of loop control.

Accordingly, when such a service 200 that does not possibly cause the occurrence of loop control is preset as the deletion-target service 200, it is possible to prevent the control information corresponding to the deletion-target service 200 from remaining in the loop candidate table 900 for a certain amount of time or more. This makes it possible to reduce cases in which the repetition count 904 included in the control information corresponding to the deletion-target service 200 becomes larger than or equal to the threshold. As a result, it is possible to reduce cases in which the deletion-target service 200 is used as the service 200 identified in step 805 and the service 200 identified in step 806, that is, cases in the deletion-target service 200 is identified as a service 200 that causes the occurrence of loop control.

The determination (in step 805 in FIG. 10) as to whether or not the repetition count 904 is larger than or equal to the threshold may be made not only on the repetition count 904 included in the control information corresponding to the service 200 executed in step 801 but also on the repetition counts 904 included in all of the control information registered in the loop candidate table 900. Correspondingly, when the repetition counts 904 included in a predetermined number of pieces of control information or more reach the threshold, the process may proceed to step 806.

Alternatively, in step 806, the contention determination unit 213 may determine that control information that includes the same equipment ID 902 as the equipment ID 902 included in the control information corresponding to the service 200 identified in step 805, that includes a service ID 901 different from the service ID 901 included in the control information, and in which the repetition count 904 is larger than or equal to the threshold exists in the loop candidate table 900. By limiting the control information to be determined in step 806, as described above, it is possible to more accurately determine that loop control is being performed.

Second Embodiment

Figure 16:
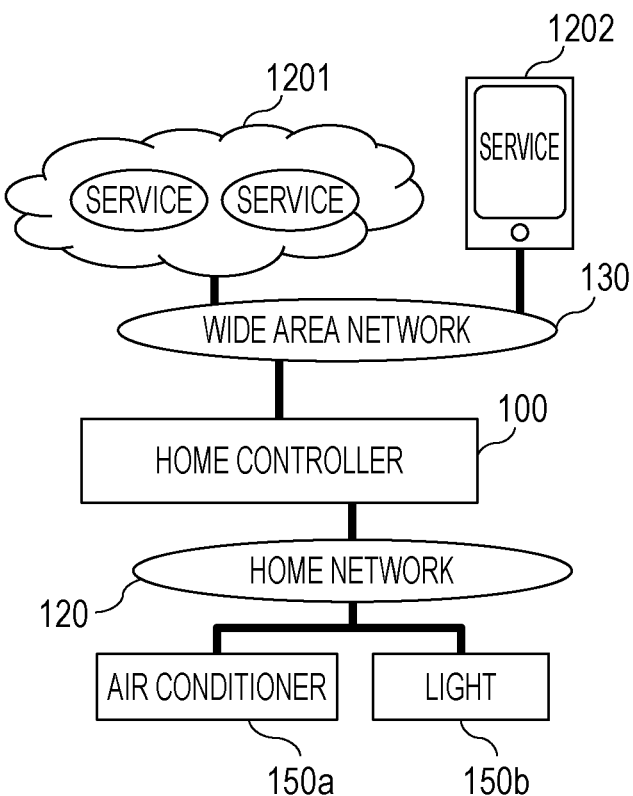
FIG. 16 is a diagram illustrating an overview of a home network system in a second embodiment.

The description in the first embodiment has been given of a method for detecting loop control on the same equipment 150, the loop control being performed by the plurality of services 200 executed by the home controller 100, and a method for disabling the loop control. A description in a second embodiment will be given of a method for detecting the occurrence of loop control on the same equipment 150 and a method for disabling the loop control when a plurality of services is executed by apparatuses other than the home controller 100. Examples of such apparatuses include a cloud server 1201 and an external terminal 1202, such as a smartphone or a tablet computer, connected to the wide area network 130, as illustrated in FIG. 16.

Services (illustrated in FIG. 16) executed by the cloud server 1201 and the external terminal 1202 are examples, and any service for controlling the equipment 150 connected to the home network 120 via the home controller 100 may be executed by the apparatus or apparatuses connected to the home network 120. The following description in the second embodiment will be given of portions that are different from those in the first embodiment, unless otherwise particularly stated.

FIG. 17 is a diagram illustrating the functional configuration of a home network system including a home controller 100 in the second embodiment. Since the hardware configuration of the home controller 100 is the same as or similar to that in the first embodiment, a description thereof is not given hereinafter.

In the second embodiment, a comfort air conditioning service 1200*a* is executed by the cloud server 1201, and an in-house power-saving service 1200*b* is executed by the external terminal 1202, such as a smartphone or a tablet computer. Also, a comfort light control service 200*c* is executed by the home controller 100, as in the first embodiment. The services 1200*a* and 1200*b* executed by the apparatuses other than the home controller 100 over the wide area network 130 are collectively referred to as "services 1200" hereinafter.

A service control unit 1210 includes a command communication unit 1217 in addition to the configuration in the first embodiment. The command communication unit 1217 transmits/receives control commands and so on to/from the external apparatuses connected to the wide area network 130. That is, all communications with the external apparatuses connected to the wide area network 130, for example, when the state monitoring unit 214 reports a state change in the equipment 150 to be monitored by any of the services 1200, when the service management unit 211 outputs a request for starting or terminating any of the services 1200, or when any of the services 1200 outputs a request for controlling the equipment 150, are performed via the command communication unit 1217.

The central processing unit 101 executes a program for the realizing the functions of the individual blocks illustrated in FIG. 17, to thereby make it possible to implement the functional configuration of the home controller 100 illustrated in FIG. 17. Dedicated circuits that function as the individual blocks illustrated in FIG. 17 may be combined to realize the functional configuration of the home controller 100 illustrated in FIG. 17.

FIG. 18 illustrates one example of a service management table 1400*a*. The service management table 1400*a* is a table for managing service management information in which service IDs of the services 200 and 1200 and addresses of apparatuses that can execute the services 200 and 1200 are associated with each other. The service management table 1400a is stored in the primary storage unit 102.

Figure 19:
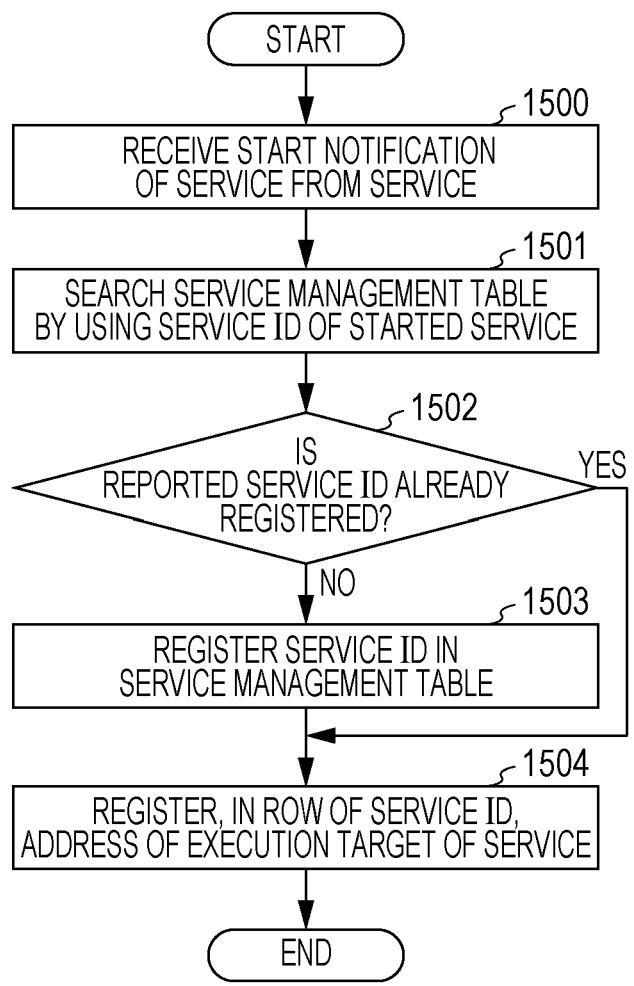
FIG. 19 is a flowchart illustrating one example of a processing flow of registering information in the service management table in the second embodiment.

A flow of registering a service ID and an address in the service management table 1400a, the registration being performed by the command communication unit 1217, will be described with reference to FIG. 19. FIG. 19 is a flowchart illustrating one example of a processing flow of registering information in the service management table 1400a in the second embodiment.

When an external apparatus starts any of the services 1200, the started service 1200 notifies the service control unit 1210 that the service 1200 was started. The notification of the start of the service 1200 is performed by calling a start notification API, provided by the service control unit 1210, over the wide area network 130, the calling being performed by the service 1200 that was started by the external apparatus. Similarly, in the second embodiment, when the service executing unit 212 performs processing for starting any of the services 200, the started service 200 calls the start notification API and notifies the service control unit 1210 that the service 200 was started.

The start notification API receives, from the service 200 or 1200, the service ID of the service 200 or 1200 that called the start notification API, the address of the apparatus has become able to execute the service 200 or 1200 upon the start of the service 200 or 1200 (hereinafter, this address is referred to as the "address of the apparatus that executes the service 200 or 1200"). The start notification API then reports the received service ID and the address of the apparatus that executes the service 200 or 1200 to the service control unit 210.

Upon receiving the service ID of the service 200 or 1200 and the address of the apparatus that executes the service 200 or 1200 (step 1500), the service ID and the address being reported from the start notification API (this reporting may hereinafter be referred to as a "start notification of the service 200 or 1200"), the command communication unit 1217 performs searching to determine whether or not the reported service ID is registered in the service management table 1400a (step 1501).

If the reported service ID is already registered in the service management table 1400a (YES in step 1502), the command communication unit 1217 registers the address of the apparatus that executes the service 200 or 1200, the address being reported in step 1500, as an address corresponding to the registered service ID (step 1504).

If the reported service ID is not yet registered in the service management table 1400a (NO in step 1502), the command communication unit 1217 registers the reported service ID in the service management table 1400a (step 1503) and registers the address of the apparatus that executes the service 200 or 1200, the address being reported in step 1500, as an address corresponding to the registered service ID (step 1504).

The flows of registering and deleting an equipment ID and a service ID in the state monitor table 300 in the second embodiment are substantially the same as the flows illustrated in FIGS. 7 and 8, except that the start and termination of each service 1200 are performed via the command communication unit 1217, and thus a description of the flows in the second embodiment are not given hereinafter. Also, since a flow of detecting loop control in the second embodiment is the same as or similar to the flow illustrated in FIG. 10, a description thereof is not given hereinafter.

The information reported from the start notification API may also include the equipment ID of the equipment 150 whose state is to be monitored by the service 200 or 1200. Correspondingly, the command communication unit 1217 may report, to the state monitoring unit 214, the service ID and the equipment ID of the equipment 150 whose state is to be monitored, the service ID and the equipment ID being reported from the start notification API. In addition, on the basis of the flow illustrated in FIG. 7, the state monitoring unit 214 may register, in the state monitor table 300, the equipment ID and the service ID reported from the command communication unit 1217, as in the case of the equipment ID and the service ID reported from the equipment-state monitoring API in step 400.

In this case, after the service 1200 started by the external apparatus issues the start notification of the service 1200 by using the start notification API, calling the equipment-state monitoring API over the wide area network 130 and reporting the equipment ID of the equipment 150 whose state is to be monitored by the service 1200 and the service ID of the service 1200 can be omitted in step 400 illustrated in FIG. 7. This makes it possible to reduce the number of communications with the external apparatus.

Now, processing after loop control is detected in the second embodiment will be described with reference to FIG. 20. FIG. 20 is a flowchart illustrating one example of a processing flow of disabling loop control in the second embodiment.

When the contention determination unit 213 identifies any of the services 200 and 1200 which cause the occurrence of loop control (step 1600), in accordance with the flow illustrated in FIG. 10, the service management unit 211 determines the service 200 or 1200 to be terminated among the identified services 200 and 1200 (the service 200 or 1200 to be terminated is hereinafter referred to as a "termination service 200 or 1200"), as in step 1001 described above. The service management unit 211 then issues a request for terminating the determined termination service 200 or 1200 and outputs the request for terminating the termination service 200 or 1200 to the command communication unit 1217 (step 1601).

Upon receiving the request for terminating the termination service 200 or 1200 from the service management unit 211, the command communication unit 1217 refers to the service management table 1400a to obtain an address corresponding to the service ID of the termination service 200 or 1200. The command communication unit 1217 transmits the request for terminating the termination service 200 or 1200 to the obtained address (step 1602).

Thus, when the request for terminating one of the termination service 1200 is transmitted to the external apparatus in step 1602, the external apparatus receives the termination request and performs processing for terminating the termination service 1200. On the other hand, when the request for terminating the termination service 200 is sent to the home controller 100 in step 1602, processing that is similar to that in step 1002 illustrated in FIG. 12 is performed, as described above.

Thereafter, the display generation unit 216 generates a message to be included in the notification screen W1 illustrated in FIG. 13 or the notification screen W2 illustrated in FIG. 14 and causes the display unit 104 to display the notification screen W1 or the notification screen W2 including the generated message (step 1603), in the same manner as in step 1003 in FIG. 12.

Even when the command communication unit 1217 transmits the request for terminating the termination service 1200 to the external apparatus in step 1602, there is a possibility that the processing for terminating the termination service 1200 is not performed, for example, for the reason that the external apparatus is not given the authority to execute the processing for terminating the termination service 1200 or for the reason that a communication failure occurs and the request for terminating the termination service 1200 is not received by the external apparatus.

Thus, in step 1602, instead of the command communication unit 1217 transmitting the request for terminating the termination service 1200 to the external apparatus, the command communication unit 1217 may be adapted to be able to reject a request for controlling the equipment 150, the control request being transmitted from the termination service 1200, and to transmit a message indicating that the control request is rejected to the termination service 1200. With this arrangement, the user of the termination service 1200 may be informed that the control of the equipment 150 which is to be performed by the termination service 1200 is rejected.

This configuration can be realized as described below. The structure of the service management table 1400*a* may be modified to the structure of a service management table 1400*b* illustrated in FIG. 21. That is, service management information in which at least a flag (i.e., each service termination authority in FIG. 21) indicating whether or not a termination authority that allows the started service 200 or 1200 to be terminated is given is further associated with the service ID of the service 200 or 1200 and the address of the apparatus that can execute the service 200 or 1200 may be managed in the service management table 1400*a*.

The flag may be further added to the information reported from the start notification API and be reported from the service 200 or 1200. In step 1504 illustrated in FIG. 19, during registration of the address of the apparatus that executes the service 200 or 1200, the address being reported from the start notification API in step 1500, the flag reported from the start notification API may be further registered in association with the service ID of the service 200 or 1200.

Subsequently, if the command communication unit 1217 receives the request for terminating the termination service 200 or 1200 from the service management unit 211 in step 1602, and the flag corresponding to the service ID of the termination service 200 or 1200, the flag being included in the service management table 1400*a* having the modified structure, indicates that the no termination authority is given, then a control request from the termination service 200 or 1200 may be rejected. In addition, information indicating that the control request was rejected may be returned to the termination service 200 or 1200.

In step 1602, if the command communication unit 1217 fails to properly transmit the request for terminating the service 1200, owing to occurrence of a communication failure or the like, a control request for the equipment 150 from the service 1200 may also be rejected.

With this configuration, even when loop control occurs as a result of control executed by the service 1200 for which the home controller 100 is not given the termination authority, it is possible to disable the loop control.

The service management table 1400*a* may be modified to have a configuration for managing service management information in which at least user IDs for identifying users who have started the services 200 and 1200 and the addresses of terminals associated with the users are associated with each other in addition to the service IDs of the started services 200 and 1200 and the addresses of the apparatuses that can execute the services 200 and 1200, as in the service management table 1400*b* illustrated in FIG. 21.

Each user ID may be further added to the information reported from the start notification API and be reported from the service 200 or 1200. The address of the terminal associated with each user may be pre-associated with the user ID of the user and be in the secondary storage unit 103. In step 1504 illustrated in FIG. 19, during registration of the address of the apparatus that executes the service 200 or 1200, the address being reported from the start notification API in step 1500, the user ID reported from the start notification API and the terminal address stored in the secondary storage unit 103 in association with the user ID may further be registered in association with the service ID of the service 200 or 1200.

Correspondingly, in addition to the process in step 1603, the command communication unit 1217 may obtain, in the service management table 1400*a* having the modified configuration, the terminal address associated with the service ID of the termination service 200 or 1200 indicated by the termination request received in step 1602. In addition, the command communication unit 1217 may report the message generated by the display generation unit 216 in step 1603 to the obtained address.

This configuration allows a user who has started the termination service 200 or 1200 to recheck the details of control of the equipment 150 which is performed by the termination service 200 or 1200, without affecting the services 200 and 1200 used by other users.

The present disclosure is useful for equipment connected to a home network, a home controller for remotely controlling the equipment, and a service that is executed via a home controller.

What is claimed is:

1. A control method for a controller configured to control a first appliance connected to a network, the control method comprising:
   executing a first application for operating the first appliance in order to provide a first service;
   transmitting a first command corresponding to the first application to the first appliance;
   executing a second application for operating the first appliance in order to provide a second service;
   transmitting a second command corresponding to the second application to the first appliance;
   storing an execution log each time the first application and the second application are executed, wherein the execution log includes a first log corresponding to execution of the first application and a second log corresponding to execution of the second application, the first log including an identifier of the first service, an identifier of the first appliance, and a first operation that the first command causes the first appliance to execute, and the second log including an identifier of the second service, the identifier of the first appliance, and a second operation that the second command causes the first appliance to execute;
   detecting that the first application and the second application are alternately executed on the first appliance at least a predetermined number of times, based on the execution log;
   terminating the execution of at least the first application when the first application and the second application are alternately executed the at least the predetermined number of times; and
   stopping the transmission of the first command to the first appliance.

2. The control method according to claim 1,
wherein the execution of the first application is started prior to the execution of the second application.

3. The control method according to claim 1,
wherein the execution of the first application is started after the execution of the second application.

4. The control method according to claim 1,
wherein the first service is not a preset service.

5. The control method according to claim 1, further comprising:
transmitting to a user notification information indicating that the transmission of the first command has been stopped.

6. The control method according to claim 5, further comprising:
storing first information indicating a correspondence between the first service and the identifier of the first service, and a correspondence between the second service and the identifier of the second service; and
identifying the first service, based on the first information, wherein the notification information indicates the first service.

7. The control method according to claim 6, further comprising:
storing second information indicating a correspondence between the first appliance and the identifier of the first appliance, and a correspondence between a second appliance and an identifier of the second appliance; and
identifying the first appliance and the first operation, based on the execution log and the second information, wherein the notification information further indicates the first appliance and the first operation.

8. The control method according to claim 5,
wherein the user includes a first user;
the control method further comprises storing, based on the execution log, third information indicating a correspondence of the identifier of the first service provided to the first user upon executing the first application, an identifier of the first user, and an identifier of a first terminal, the identifier of the first terminal being associated with the first user; and
the notification information is transmitted to the first terminal, based on the third information.

9. The control method according to claim 1, further comprising:
storing fourth information and fifth information, based on the execution log, wherein the fourth information indicates a correspondence of the identifier of the first service provided to the user upon executing the first application, the identifier of the first appliance, the first operation, and the number of times the first command was transmitted to the first appliance, and the fifth information indicates a correspondence of the identifier of the second service provided to the user upon executing the second application, the identifier of the first appliance, the second operation, and the number of times the second command was transmitted to the first appliance; and
deleting the fourth information at every predetermined time interval, when the identifier of the first service indicates a predetermined service, and deleting the fifth information at every predetermined time interval, when the identifier of the second service indicates the predetermined service.

10. A controller for controlling an appliance connected to a network, the controller comprising:

a processor, the processor being configured to execute a plurality of processes for controlling the appliance, comprising:
executing a first application for operating the appliance in order to provide a first service;
transmitting a first command corresponding to the first application to the appliance;
executing a second application for operating the appliance in order to provide a second service;
transmitting a second command corresponding to the second application to the appliance;
storing an execution log each time the first application and the second application are executed, wherein the execution log includes a first log corresponding to execution of the first application and a second log corresponding to execution of the second application, the first log including an identifier of the first service, an identifier of the appliance, and a first operation that the first command causes the appliance to execute, and the second log including an identifier of the second service, the identifier of the appliance, and a second operation that the second command causes the appliance to execute;
detecting that the first application and the second application are alternately executed on the appliance at least a predetermined number of times, based on the execution log;
terminating the execution of at least the first application when the first application and the second application are alternately executed the at least the predetermined number of times; and
stopping the transmission of the first command to the appliance.

11. A non-transitory computer readable storage medium encoded with an executable computer program for controlling an appliance connected to a network, when executed by a processor, causes the processor to perform operations comprising:
executing a first application for operating the appliance in order to provide a first service;
transmitting a first command corresponding to the first application to the appliance;
executing a second application for operating the appliance in order to provide a second service;
transmit a second command corresponding to the second application to the appliance;
storing an execution log each time the first application and the second application are executed, wherein the execution log includes a first log corresponding to execution of the first application and a second log corresponding to execution of the second application, the first log including an identifier of the first service, an identifier of the appliance, and a first operation that the first command causes the appliance to execute, and the second log including an identifier of the second service, the identifier of the appliance, and a second operation that the second command causes the appliance to execute;
detecting that the first application and the second application are alternately executed on the appliance at least a predetermined number of times, based on the execution log;
terminating the execution of at least the first application when the first application and the second application are alternately executed the at least the predetermined number of times; and stopping the transmission of the first command to the appliance.

12. A control method for a controller for controlling an appliance connected to a network, the controller being connected to a server, the control method comprising:
    transmitting a first command corresponding to a first application executed by the server to the appliance, the first application being an application for operating the appliance in order to provide the first service;
    transmitting a second command corresponding to a second application executed by the server to the appliance, the second application being an application for operating the appliance in order to provide a second service;
    storing an execution log each time the first application and the second application are executed, wherein the execution log includes a first log corresponding to execution of the first application and a second log corresponding to execution of the second application, the first log including an identifier of the first service, an identifier of the appliance, and a first operation that the first command causes the appliance to execute, and the second log including an identifier of the second service, the identifier of the appliance, and a second operation that the second command causes the appliance to execute;
    detecting that the first application and the second application are alternately executed on the appliance a predetermined number of times or more, based on the execution log;
    transmitting, to the server, a termination request for causing the server to terminate the execution of at least the first application, when the first application and the second application are alternately executed a predetermined number of times or more; and
    stopping the transmission of the first command to the appliance.

13. A control method for a controller for controlling air-conditioning appliance connected to a network, the control method comprising:
    executing a first application for operating the air-conditioning appliance in order to provide a first operation, the first operation being automatically controlling a temperature of the air-conditioning appliance;
    transmitting a first command corresponding to the first application to the air-conditioning appliance, the first command causing the air-conditioning appliance to set a temperature;
    executing a second application for operating the air-conditioning appliance in order to provide a second operation, the second operation being automatically controlling power consumed by the air-conditioning appliance;
    transmitting a second command corresponding to the second application to the air-conditioning appliance, the second command causing turning on or off power supply of the air-conditioning appliance;
    storing an execution log each time the first application and the second application are executed, wherein the execution log includes a first log corresponding to execution of the first application and a second log corresponding to execution of the second application, the first log including an identifier of the first operation, an identifier of the air-conditioning appliance, and first temperature information to be set for the air-conditioning appliance, and the second log including an identifier of the second operation, the identifier of the air-conditioning appliance, and information indicating whether the air-conditioning appliance is to be turned on or off;
    detecting that the first application and the second application are alternately executed on the air-conditioning appliance at least a predetermined number of times, based on the execution log;
    terminating the execution of the first application or the second application when the first application and the second application are alternately executed the at least the predetermined number;
    stopping the transmission of the first command to the air-conditioning appliance when the first application is terminated; and
    stopping the transmission of the second command to the air-conditioning appliance when the second application is terminated.

* * * * *